(12) United States Patent
Patterson

(10) Patent No.: US 7,451,168 B1
(45) Date of Patent: Nov. 11, 2008

(54) INCREMENTAL GARBAGE COLLECTION OF DATA IN A SECONDARY STORAGE

(75) Inventor: R. Hugo Patterson, Mountain View, CA (US)

(73) Assignee: Data Domain, Inc., San Mateo, CA (US)

( * ) Notice: Subject to any disclaimer, the term of this patent is extended or adjusted under 35 U.S.C. 154(b) by 419 days.

(21) Appl. No.: 10/611,291

(22) Filed: Jun. 30, 2003

(51) Int. Cl.
*G06F 17/30* (2006.01)
*G06F 12/00* (2006.01)
*G06F 17/00* (2006.01)
*G06F 7/00* (2006.01)
*G06F 13/00* (2006.01)
*G06F 13/28* (2006.01)

(52) U.S. Cl. .................... 707/206; 707/204; 707/104.1; 711/162

(58) Field of Classification Search ................ 707/101, 707/102, 203, 204, 205, 206, 104.1; 711/162
See application file for complete search history.

(56) References Cited

U.S. PATENT DOCUMENTS

| | | | |
|---|---|---|---|
| 4,714,992 A | 12/1987 | Gladney et al. | |
| 5,619,693 A * | 4/1997 | Troisi | ............................. 707/7 |
| 5,774,588 A | 6/1998 | Li | |
| 5,819,292 A * | 10/1998 | Hitz et al. | .................... 707/203 |
| 5,829,005 A * | 10/1998 | Senator | ....................... 707/100 |
| 5,920,875 A * | 7/1999 | Clark et al. | .................. 707/206 |
| 5,963,962 A * | 10/1999 | Hitz et al. | .................... 707/202 |
| 5,966,708 A * | 10/1999 | Clark et al. | .................. 707/101 |
| 5,990,810 A | 11/1999 | Williams | |
| 6,073,160 A | 6/2000 | Grantham et al. | |
| 6,173,293 B1 * | 1/2001 | Thekkath et al. | ............ 707/201 |
| 6,249,792 B1 * | 6/2001 | Zwilling et al. | ............. 707/205 |
| 6,321,240 B1 * | 11/2001 | Chilimbi et al. | ............ 707/206 |
| 6,353,834 B1 * | 3/2002 | Wong et al. | .................. 707/202 |
| 6,480,862 B1 | 11/2002 | Gall | |
| 6,594,678 B1 * | 7/2003 | Stoutamire et al. | .......... 707/206 |
| 6,868,488 B2 | 3/2005 | Garthwaite | |
| 2001/0037323 A1 | 11/2001 | Moulton et al. | |
| 2002/0038304 A1 * | 3/2002 | Gelfand | ....................... 707/100 |
| 2003/0208500 A1 * | 11/2003 | Daynes et al. | .............. 707/100 |

OTHER PUBLICATIONS

Chilimbi, et al., Using Generational Garbage Collection To Implement Cache-Concious Data Placement, 1998, ACM.*
Chilimbi, et al., Cache-Concious Structure Layout, 1999, ACM.*
Menon, et al., An Age-Threshold Algorithm for Garbage Collection in Log-Structured Arrays and File Systems, 1998, IBM.*

(Continued)

*Primary Examiner*—Apu Mofiz
*Assistant Examiner*—Brent Stace
(74) *Attorney, Agent, or Firm*—Blakely, Sokoloff, Taylor & Zafman LLP

(57) ABSTRACT

A method and apparatus for different embodiments of incremental garbage collection of data in a secondary storage. In one embodiment, a method comprises locating blocks of data in a log that are referenced and within a range at a tail of the log. The method also includes copying the blocks of data that are referenced and within the range to an unallocated segment of the log.

44 Claims, 16 Drawing Sheets

OTHER PUBLICATIONS

Menon, Jai, A Performance Comparison of RAID-5 and Log-Structured Arrays, 1995, IEEE.*

Microsoft, Microsoft Computer Dictionary, 2002, Microsoft Press, 5$^{th}$ ed.*

Ruffin, Michel, "Log Compaction and Garbage Collection What could they bring to each other?" 1995, IEEE <http://ieeexplore.ieee.org/iel2/3303/9925/00470577.pdf?tp=& arnumber=470577 &isnumber=9925>, p. 1-4.*

Bloom Filter, National Institute of Standards and Technology, (1 pg); Bloom Filters Short Tutorial (5 pgs); Flip Code—Tutorial—Coding Bloom Filters (6 pgs) dated Nov. 2, 2002.

Proceedings of the FAST 2002 Conference on File and Storage Technologies, USENIX Association; Monterey, California USA, Jan. 28-30, 2002 (13 pgs).

A.Z. Broder, "Some Applications of Rabin's Fingerprinting Method.", In Sequences II: Methods in Communication, Security, and Computer Science, Springer-Verlag, 1993 (10pg).

U. Manber, "Finding Similar Files in A Large File System." USENIX Conference, 1994 (11pg).

A. Muthitacharoen, B. Chen, and D. Mazieres. "A low-bandwidth network file system." ACM SOSP Conference, 2001 (14pg).

S. Quinlan and S. Dorward, "Venti: a new approach to archival storage", USENIX FAST conference, 2002. (14pg).

* cited by examiner

LOCATION TABLE 112

| BLOCK ID | ADDRESS |
|---|---|
| 1 | 451 |
| 350 | 21 |
| 25 | 1492 |
| 4500 | 2990 |
| 14 | 156 |
| 50001 | 5 |
| 805 | 2003 |
| ⋮ | ⋮ |
| 1002 | 2999 |
| 5 | 1101 |

302 → BLOCK ID
304 → ADDRESS

FIG. 3

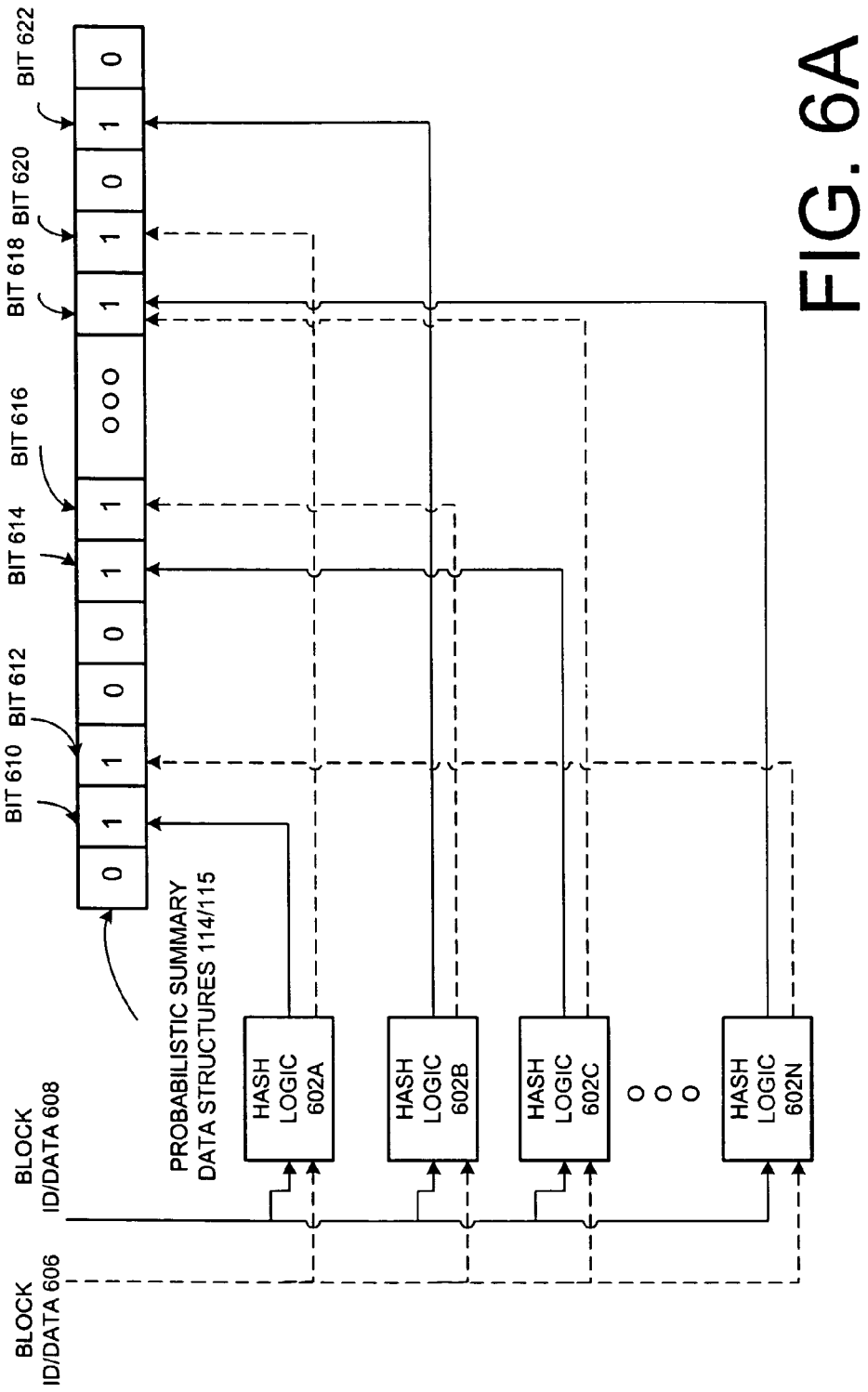

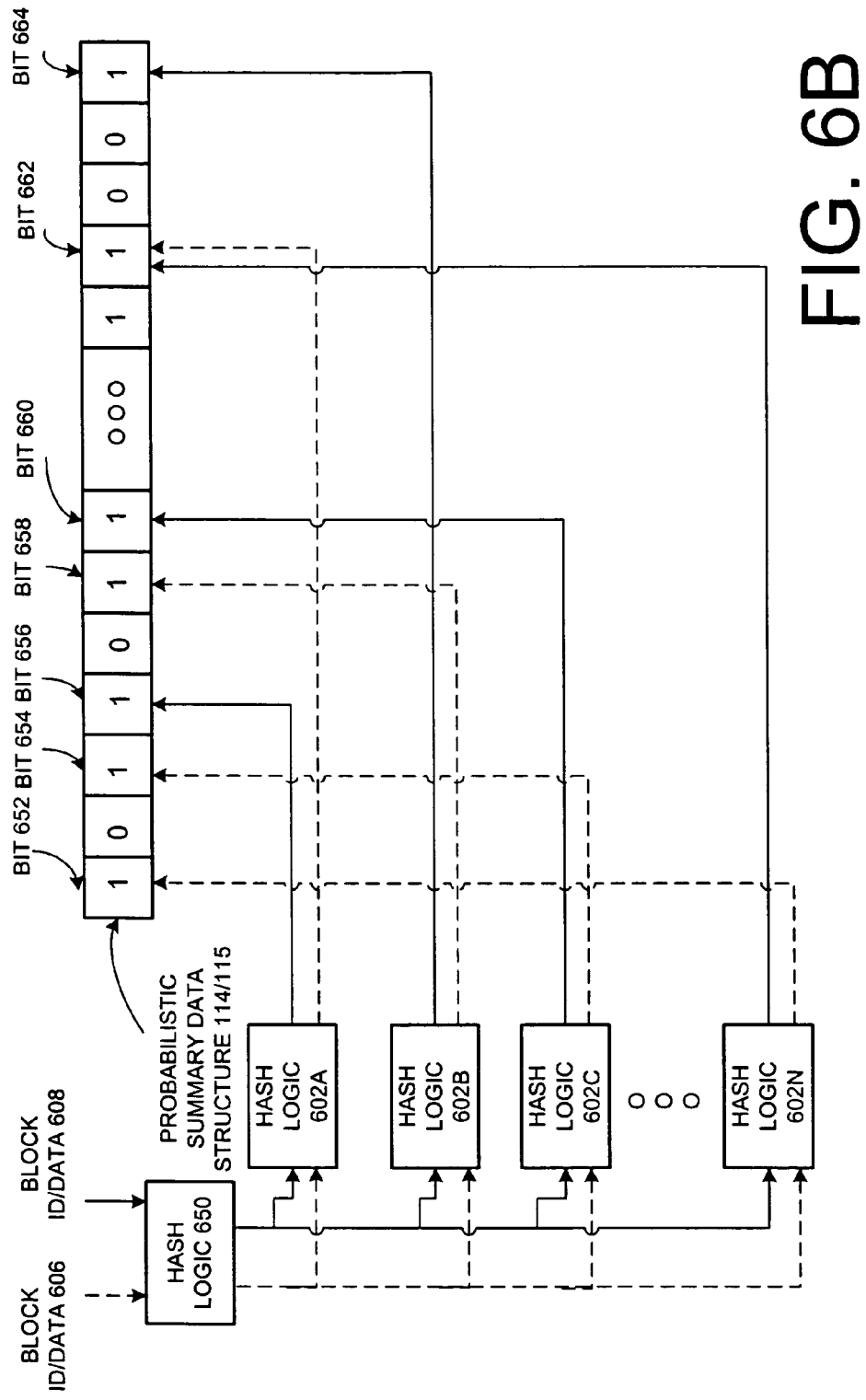

FIG. 10A

Nonreferencing Nodes Location Table 702

| BLOCK ID (1002) | OFFSET ADDRESS (1004) |
|---|---|
| 27 | 503 |
| 358 | 12 |
| 103 | 1558 |
| 18 | 3002 |
| 132 | 161 |
| 4500 | 7 |
| 55501 | 2001 |
| ... | ... |
| 4502 | 1513 |
| 11 | 998 |

FIG. 10B

Referencing Nodes Location Table 704

| BLOCK ID (1006) | OFFSET ADDRESS (1008) | MINIMUM OFFSET (1010) |
|---|---|---|
| 12 | 557 | 1101 |
| 458 | 97 | 5 |
| 33 | 1411 | 1215 |
| 3332 | 119 | 17 |
| 1505 | 251 | 4901 |
| 44 | 3009 | 1345 |
| 901 | 1201 | 569 |
| ... | ... | |
| 1010 | 5009 | 352 |
| 8 | 58 | 698 |

US 7,451,168 B1

INCREMENTAL GARBAGE COLLECTION OF DATA IN A SECONDARY STORAGE

FIELD OF THE INVENTION

The invention relates to the field of data storage. More specifically, the invention relates to an incremental garbage collection of data in a secondary storage.

BACKGROUND OF THE INVENTION

The amount of data to be stored continues to grow. In particular, the size of the applications and the data generated there from is increasing. Moreover, systems/users are backing up multiple copies of a given set of data to maintain multiple versions. For example, snapshots of a given database stored in a server are copied and stored over time, thereby allowing a given version/snapshot of a set of data to be restored. Typically, much of the data remains the same across different snapshots. For example, if the data is backed up for a given user on a daily basis and such user is updating only one of the number of files for a given day, the data in this file is the only data that has been modified. Accordingly, conventional backup operations include the sharing of data across a number of different snapshots/versions to reduce the amount of data being stored.

Furthermore, in some backup systems, the data is not modifiable. In other words, if given data is updated, such data is copied to a different location in the backup storage device (instead of modifying the data at the current location). As described, over time, all of the storage space in the backup storage device will be allocated, as blocks of data in the backup system are no longer active (but still allocated) and need to be deleted there from. Therefore, garbage collection operations are performed within these backup systems to delete data that is no longer active/referenced, thereby reclaiming unused space in the backup storage device.

A conventional approach for garbage collection of data includes a traditional mark-and-sweep garbage collection, wherein the data is periodically traversed. When traversing the data during a garbage collection operation, if the data is referenced, a tracking mechanism that includes a bit associated with the referenced data is set to indicate that the data is referenced. Accordingly, during a subsequent sweep of the data, for data whose associated tracking bit is set, such data is copied to a different location in the backup system. The range of the address space of the data that has been swept is then marked as unallocated, thereby allowing the backup system to overwrite this range of the address space with new data. There is commonly two ways of implementing the tracking mechanism. The first way is to store each of the tracking bit as part of the data itself that the bit is tracking. In such an implementation, during garbage collection operations, the system will typically require multiple accesses to the secondary storage to retrieve the tracking data stored with the data to determine if the data is to be deleted because such data is no longer referenced.

In an effort to reduce accesses to the secondary storage device, the second way of implementing the tracking mechanism is to use a separate data structure for the tracking bits. In particular, the collection of these tracking bits into a separate data structure makes the tracking bits more manageable. Even so, the data structure can become very large as the amount of data that is within the backup storage device grows. In particular, there is a one-to-one relationship between given data and a bit within the data structure. As the data structure continues to grow, typical systems will not have local memories that are large enough to store this structure. Accordingly, when there is insufficient space in the local memory, at least part of the data structure must be stored in a secondary storage device, such as a hard drive (external to local memory). Therefore, during garbage collection operations, the system has to perform a number of disk accesses to the hard drive to access this structure, thereby slowing down the operation as the number of secondary storage accesses increases.

Moreover, certain conventional mark-and-sweep garbage collection operations perform a targeted cleaning of a segment of address space in the backup storage device. However, such approaches require the walking of all of the blocks of data to determine which blocks of data are considered inactive and thus eligible for garbage collection. In particular, these mark-and-sweep garbage collection operations require the walking of all of the blocks of data in order to determine whether a given block of data is referenced by any other block of data. Disadvantageously, such an approach is not feasible when the number of blocks of data becomes too great. For example, if a snapshot of a file system is a terabyte in size and such a snapshot is taken every 10 minutes, over time the walking of the blocks of data during the marking of the garbage collection operations will not have completed prior to another snapshot being stored within the backup system.

SUMMARY OF THE INVENTION

A method and apparatus for different embodiments of incremental garbage collection of data in a secondary storage are described. In one embodiment, a method comprises locating blocks of data in a log structured secondary storage that are referenced and within a range at a tail of the log. The method also includes copying the blocks of data that are referenced and within the range to an unallocated segment of the log.

In one embodiment, a method includes garbage collecting within a range of addresses in a storage system that includes a number of storage trees having multiple references to the same block of data. The garbage collecting is performed by pruning the walking of the number of storage trees, where the walking is done to determine active blocks of data within the range. The active blocks of data are those still in one of the number of storage trees. The pruning of the walking includes determining, based on accessing in one of the number of storage trees a parent node that has a plurality of descendent nodes, that none of the number of descendant nodes are associated with blocks of data within the range. The pruning of the walking also includes skipping the walking of the plurality of descendent nodes based on the determination.

In an embodiment, wherein a block of data is associated with a node of a storage tree, a method includes performing the following until each block of data that is active in a segment to be cleaned at a tail of a log of data is copied to a head of the log. One operation includes copying blocks of data associated with child nodes of a current node that are within the range to be cleaned to the head of the log. A second operation includes retrieving a block of data associated with the current node, upon determining that a minimum address value among addresses of descendent nodes is within the range to be cleaned. A different operation includes designating, as the current node, one of the child nodes of the current node that is an interior node, upon determining that at least one child node is an interior node. Another operation includes designating, as the current node, an ancestor node of the current node whose descendent nodes are unprocessed.

In one embodiment, a system includes a storage device to store a number of blocks of data. The blocks of data that are marked as allocated are non-modifiable. The blocks of data are to be stored as log. The system also includes garbage collection logic to locate the blocks of data that are referenced and within a range at a tail of the log.

In an embodiment, a backup system includes a set of one or more storage trees, each representing a snapshot of a file system at a different time. Each leaf node of said set of storage trees is to include a block of data from said file system that has been backed up from a set of one or more storage devices. The backup system includes a storage space to store said blocks of data having been allocated from a backup storage space in said set of storage devices within records of a log. Further, the backup system includes a set of one or more location tables having stored therein a minimum address value for descendent nodes of interior nodes of said set of storage trees. The backup system also includes garbage collection logic to clean a currently selected range from the tail of said log. The garbage collection logic is to prune walking of nodes of said set of storage trees based on said set of location tables and said currently selected range.

In an embodiment, an apparatus includes a backup system to backup a file system. The backup system includes a tracking logic to generate a set of trees each representing backup snapshots of said file system at different times by recording references to blocks of backed up data stored in a set of one more storage devices. The backup system also includes allocator logic to allocate contiguous blocks of storage space from a log of a back up storage space to store said blocks of backed up data. The backup system also includes garbage collection logic to, responsive to deletion of one or more of said backup snapshots to clean a currently selected contiguous range from the tail of said log. The garbage collection logic is to walk only those nodes of said set of storage trees that possibly identify those of said blocks of data that are stored in said currently selected contiguous range or that possibly are themselves stored in said currently selected contiguous range. The garbage collection logic is to sweep said currently selected contiguous range.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given element in a Figure is associated with the number of the Figure. For example, a backup system 100 can be located in FIG. 1. However, element numbers are the same for those elements that are the same across different Figures. In the drawings:

FIG. 3 illustrates a location table for data storage and garbage collection of such stored data, according to one embodiment of the invention.

FIGS. 6A-6B illustrate the incorporation of a Bloom filter into garbage collection of data in a secondary storage, according to embodiments of the invention.

FIGS. 10A-10B illustrate location tables for data storage and garbage collection of such data, according to one embodiment of the invention.

DETAILED DESCRIPTION

Figure 1:
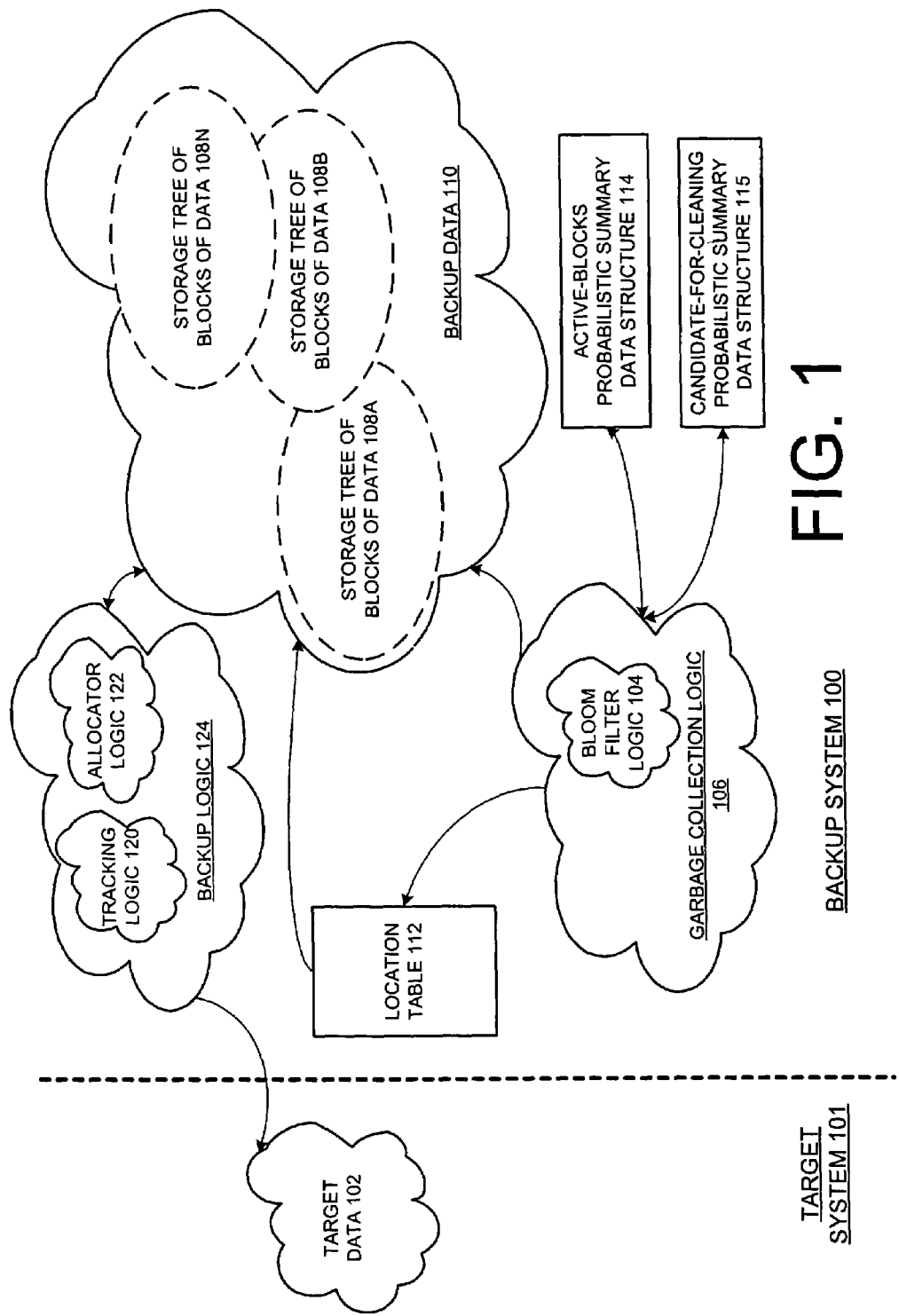
FIG. 1 illustrates a block diagram of a system that includes garbage collection operations, according to one embodiment of the invention.

A method and apparatus for different embodiments of garbage collection of data in a secondary storage are described. Although embodiments of the invention are described such that the operations are within a backup system, embodiments of the invention can also be incorporated into other storage systems. Furthermore, the term "tree" is used to refer to any type of directed acyclical graph.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Embodiments of the present invention include features, methods, or processes embodied within machine-executable instructions provided by a machine-accessible medium. A machine-accessible medium includes any mechanism which provides (i.e., stores and/or transmits) information in a form accessible by a machine (e.g., a computer, network device, personal digital assistant, manufacturing tool, any device with a set of one or more processors, etc.). In an exemplary embodiment, a machine-accessible medium includes: machine storage media (such as volatile and/or non-volatile media (e.g., read only memory (ROM); random access memory (RAM); magnetic disk storage media; optical storage media; flash memory devices; etc.), as well as machine transmission media (such as electrical, optical, acoustical or other form of propagated signals (e.g., carrier waves, infrared signals, digital signals, etc.).

Such instructions are utilized to cause a general or special purpose processor, programmed with the instructions, to perform methods or processes of the present invention. Alternatively, the features or operations of the present invention are performed by specific hardware components which contain hard-wired logic for performing the operations, or by any combination of programmed data processing components and specific hardware components. Embodiments of the present invention include software, data processing hardware, data processing system-implemented methods, and various processing operations, further described herein.

A Bloom filter uses a vector of m bits to summarize the information about n data items. Initially, each of the m bits of the vector is set to 0. There are two operations to a Bloom filter: Insert (x) and Lookup(x). Insert(x) inserts data item x into the set. Insert(x) uses k independent hashing functions, $h_1, \ldots, h_k$, each mapping an item a to $[0, \ldots m-1]$ and sets the bits at position $h_1(x), \ldots h_k(x)$ to 1. Lookup(x) checks if an item x is in the set. Lookup(x) checks all bits at position(s) $h_1(x), \ldots h_k(x)$ to determine if they are set to 1. If any one of them is 0, then x is definitely not in the set. Otherwise, there is a high probability that x will be in the set.

A number of figures show block diagrams of systems and apparatus for Bloom filter-based garbage collection of data in a secondary storage, in accordance with embodiments of the invention. A number of figures show flow diagrams illustrating operations for Bloom filter-based garbage collection of data in a secondary storage, according to embodiments of the invention. The operations of the flow diagram will be described with references to the systems shown in the block diagrams. However, it should be understood that the operations of the flow diagram could be performed by embodiments of systems and apparatus other than those discussed with reference to the block diagrams, and embodiments discussed with reference to the systems could perform operations different than those discussed with reference to the flow diagram.

Overview

One aspect of the invention incorporates a Bloom filter into the marking of a mark-and-sweep garbage collection operation for backed up data within a secondary storage, such as a file system. In particular, this aspect of the invention incorporates a Bloom filter to generate an encoded value representative of blocks of data that are marked during a mark-and-sweep garbage collection operation. As will be described in more detail below, embodiments of the invention can perform garbage collection on data in a secondary storage wherein blocks of data are referenced by a number of different other blocks of data. In an embodiment, an encoded value (e.g., a probabilistic summary data structure) is generated based on a Bloom filter and is representative of those blocks of data that are within a range of the backed up data to be cleaned. In an embodiment, a different encoded value (e.g., a second probabilistic summary data structure) is generated based on a Bloom filter and is representative of those blocks of data that are within a range of the backed up data to be cleaned. These encoded values are smaller than the data structures of tracking bits of conventional approaches, thereby reducing or eliminating accesses to a storage device outside of the local memory to access this information. For instances, in one such embodiment, the size of these encoded values is such that the entire encoded value can be stored in a local memory (e.g., random access memory) of a system performing these garbage collection operations, thereby reducing the number of disk accesses to secondary storage. Accordingly, such an approach allows garbage collection operations based on this encoded value to execute at a potentially faster rate in comparison to conventional approaches wherein the size of the data structure representing the locations of the active references is too large to be stored within a local memory.

A different aspect of the invention allows for a pruned (reduced) walking of storage trees of data within a backup system during the marking of a mark-and-sweep garbage collection operation. In one embodiment, the backup data is written as a log. In an embodiment, the incremental garbage collection operations clean the segment that is at the tail of the log (i.e., the segment having backup data that has been stored in the storage device for the longest period of time). Further, in one embodiment, the incremental garbage collection operations copy the referenced/active blocks of data to the head of the log. As will be described in more detail below, embodiments of the invention do not require the traversal of all blocks of data to determine which of said blocks are referenced/active within the segment to be cleaned during the garbage collection operations.

While these two aspects can be used together, they are independent of each other. In other words, the garbage collection operations based on a Bloom filter as described herein can be used irrespective of the incremental garbage collection operations based on data stored as a log within a backup storage device; and vice versa.

Bloom Filter-Based Encoding for Garbage Collection System Description

FIG. 1 illustrates a block diagram of a system that includes garbage collection operations, according to one embodiment of the invention. FIG. 1 includes a backup system 100 and a target system 101. The target system 101 includes target data 102 that is backed up/stored within and by the backup system 100. The target data 102 may be different types of files, objects, data structures, etc. The backup system 100 includes a backup logic 124, a garbage collection logic 106, backup data 110, a location table 112, an active blocks probabilistic summary data structure 114 and a candidates-for-cleaning probabilistic summary data structure 115. Garbage collection logic 106 includes a Bloom filter logic 104.

The backup data 110 includes a number of storage trees of blocks of data 108A-108N. One embodiment of the storage trees of the blocks of data 108 is described in more detail below in conjunction with FIG. 4. While termed a tree, the storage trees of the blocks of data 108 are representative of other type of structures, such as lists, tables, arrays, etc. For example, in one embodiment, a storage tree could include two tiers, wherein a table references a number of different leaf nodes. In an embodiment, the blocks of data stored in the backup data 110 are non-modifiable. Accordingly, the current allocated blocks of data are not overwritten or modified.

In one embodiment, the storage trees of the blocks of data 108 are snapshots of the target data 102 over time. For example, the target data 102 could be data stored on a server that is backed up once a day. Accordingly, the storage trees of blocks of data 108 are daily snapshots of the target data 102. However, embodiments of the invention are not so limited. For example, alternatively, the storage trees of the blocks of data 108 are parts of the target data 102 (such as particular file directories), which are backed up on command from a system administrator. As shown, the storage trees of the blocks of data 108 overlap, thereby illustrating that the blocks of data may be shared across different storage trees. A more detailed embodiment of the storage trees of the blocks of data 108 and their overlapping is described in more detail below in conjunction with FIG. 4.

The backup logic 124 includes a tracking logic 120 and an allocator logic 122. As shown, the backup logic 124 is coupled to retrieve the target data 102 from the target system 101. The allocator logic 122 within the backup logic 124 stores the target data 102 or a part thereof within the backup data 110. As will be further described below, the tracking logic 120 generates a number of storage trees wherein the blocks of data retrieved from the target data 102 are the leaf nodes of such trees. Further, the tracking logic 120 generates a number of interior nodes for the storage trees that include references/pointers to other interior nodes and/or leaf nodes within the storage trees. Accordingly, as will be described in more detail below, the references/pointers within the interior nodes allow for the sharing of blocks of data within and among the different storage trees. For example, a given storage tree may be a snapshot of a file system from the target data 102 at a given time. Therefore, the blocks of data that are not modified across the different snapshots are shared among the different storage trees.

The garbage collection logic 106 is coupled to the backup data 110, the location table 112, the active-blocks probabilistic summary data structure 114 and the candidates-for-cleaning probabilistic summary data structure 115. As will be described in more detail below, the location table 112 allows for a level of indirection, wherein an identification of a block of data within the backup data 110 is associated with the address of the block of data within the backup data 110. Other blocks of data reference a given block of data based on the identification for this given block of data stored in the location table 112. Accordingly, when blocks of data are moved or copied within the backup data 110, the location table 112 only needs to be updated with regard to the change of address for this block of data (rather than each reference). One embodiment of the location table 112 is described in more detail below in conjunction with FIG. 3.

The Bloom filter logic 104 within the garbage collection logic 106 generates the active-blocks probabilistic summary data structure 114 and the candidates-for-cleaning probabilistic summary data structure 115. The generation of these probabilistic summary data structures 114/115 is described in more detail below in conjunction with FIGS. 5A-5C and 6A-6B. As further described below, the garbage collection logic 106 uses the active-blocks probabilistic summary data structure 114 and the candidates-for-cleaning probabilistic summary data structure 115 to determine which blocks within the backup data 110 or a part thereof are active. An active block of data is defined as a block of data that is referenced by at least one other active block of data or is a root node of a storage tree that is still maintained within the backup system. Furthermore, the garbage collection logic 106 moves and/or copies blocks of data based on this determination using the location table 112.

Figure 2:
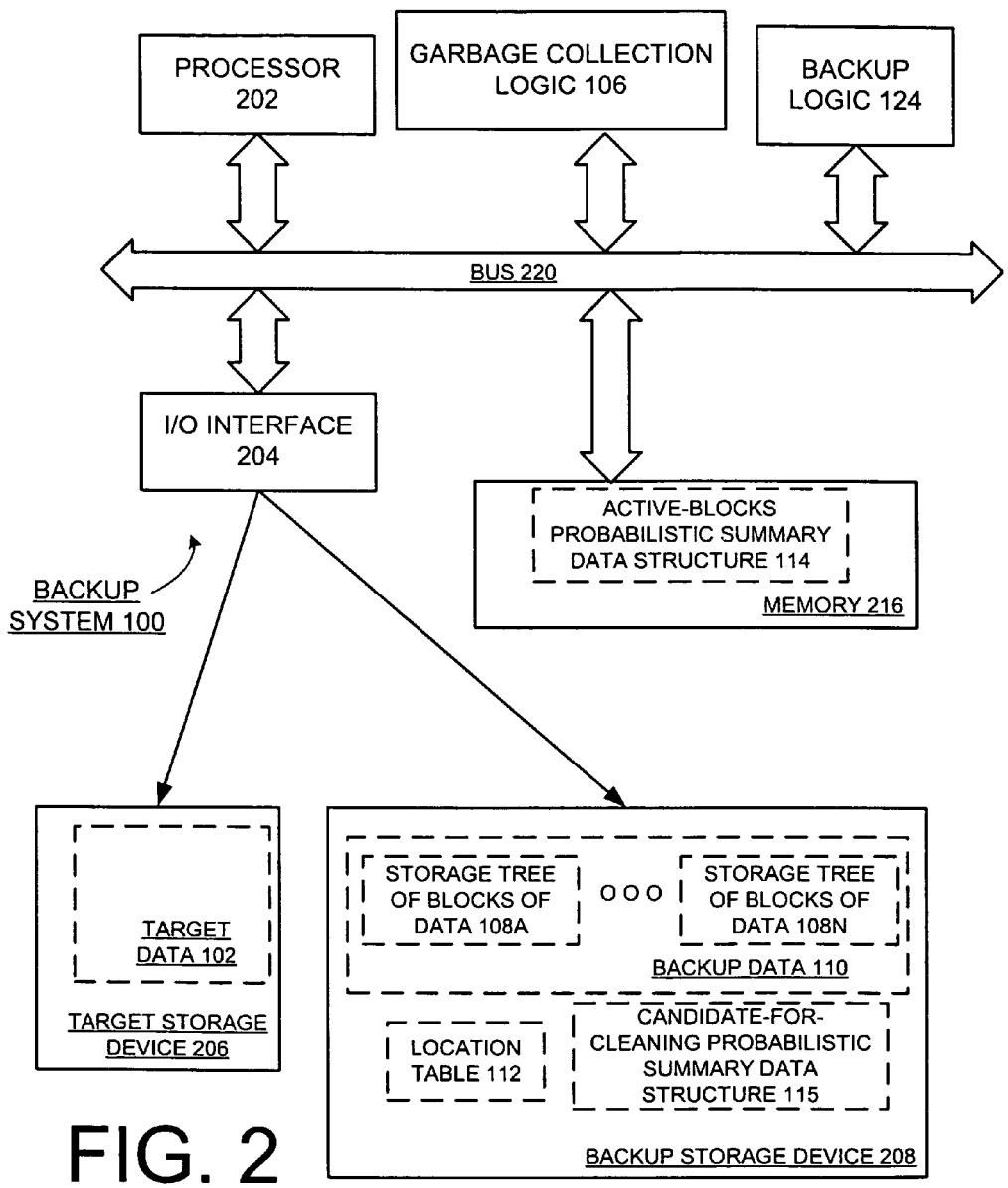
FIG. 2 illustrates a more detailed block diagram of a backup system, according to one embodiment of the invention.

FIG. 2 illustrates a more detailed block diagram of a backup system, according to one embodiment of the invention. In particular, FIG. 2 illustrates the backup system 100 that includes a processor 202, the garbage collection logic 106, the backup logic 124, an input/output (I/O) interface 204 and a memory 216 which are coupled together through a system bus 220.

The I/O interface 204 is coupled to input data into and output data from a target storage device 206 and a backup storage device 208. The target storage device 206 stores the target data 102. The backup storage device 208 stores the backup data 110, the location table 112 and the candidates-for-cleaning probabilistic summary data structure 115. The memory 216 stores the active-blocks probabilistic summary data structure 114. In one embodiment, the size of the active-blocks probabilistic summary data structure 114 is such that the entire summary data structure can be stored in the memory 216, thereby reducing the number of secondary storage accesses. For example, in one embodiment, for approximately a terabyte of data on which the garbage collection operations are being performed, the size of the encoded value is approximately a gigabyte, while the Bloom filter that generates the encoded value includes approximately four to eight hashes.

Accordingly, if the entire active-blocks probabilistic summary data structure 114 is stored within the memory 216, the garbage collection logic 106 is not required to retrieve the active-blocks probabilistic summary data structure 114 from the backup storage device 208. Therefore, such an approach allows garbage collection operations based on this summary data structure to execute at a potentially faster rate in comparison to conventional approaches wherein the size of the data structure representing the locations of the active references is too large to be stored within a local memory.

In an embodiment, the backup logic 124, the garbage collection logic 106 and the Bloom filter logic 104 may be processes or tasks that can reside within the memory 216, the backup storage device 208 and/or the processor 202 and can be executed within the processor 202. However, embodiments of the invention are not so limited, as the backup logic 124, the garbage collection logic 106 and the Bloom filter logic 104 may be different types of hardware (such as digital logic) executing the processing described therein (which is described in more detail below).

FIG. 3 illustrates a location table for data storage and garbage collection of such stored data, according to one embodiment of the invention. In particular, FIG. 3 illustrates one embodiment of the location table 112.

As shown, the location table 112 includes a block identification column 302 and an address column 304. The block identification column 302 and the address column 304 may include one to a number of entries. A given entry in the block identification column 302 is associated with a given entry in the address column 304. A value of the identification of a block of data is unique relative to the other values of identifications of blocks of data. While the identification of the blocks of data may be based on one of a number of different identifications, in one embodiment, the identification of a block of data is a hash/fingerprint of the data stored in the block of data. In a different embodiment, the identification of the block of data is a random number assigned when the block of data is stored in the backup storage device 208. In one embodiment, the identification of the block of data is a number that is sequentially assigned when the block of data is stored in the backup storage device 208. For example, the first block of data stored in the backup storage device 208 has an identification of one, the second block of data has an identification of two, etc. In another embodiment, the identification of the block of data is a timestamp of when the block of data is stored in the backup storage device 208.

As shown in FIG. 3, a block of data at address 451 within the backup storage device 208 has an identification of 1. The block of data at address 21 within the backup storage device 208 has an identification of 350. The block of data at address 1492 within the backup storage device 208 has an identification of 25. The block of data at address 2990 within the backup storage device 208 has an identification of 4500. The block of data at address 156 within the backup storage device 208 has an identification of 14. The block of data at address 5 within the backup storage device 208 has an identification of 50001. The block of data at address 2003 within the backup storage device 208 has an identification of 805. The block of data at address 2999 within the backup storage device 208 has an identification of 1002. The block of data at address 1101 within the backup storage device 208 has an identification of 5.

As further described below, the backup logic 124 and the garbage collection logic 106 use the location table 112 to locate blocks of data that are referenced based on their identifications instead of their actual addresses within the backup storage device 208. Accordingly, if a first block of data includes a reference to a second block of data, the first block of data stores the identification of the second block of data instead of the address. When the second block of data is dereferenced through the first block of data, the location table 112 is used to translate the identification to the actual address within the backup storage device 208. Accordingly, when blocks of data are moved or copied within the backup storage device 208, the location table 112 only needs to be updated with regard to the change of address for this block of data (rather than each of the different references in the blocks of data).

When a block of data is retrieved from the target system 100 and stored (and is representative of or associated with a leaf node of a storage tree) in the backup data 110, the allocator logic 122 generates an entry into the location table 112 that includes the block identification and the address where the block of data is stored. When a block of data associated with an interior node of a storage tree is created by the tracking logic 120 to allow for the sharing of the blocks of data within and among the storage trees, the tracking logic 120 also generates an entry into the location table 112 that includes the block identification and the address.

Figure 4:
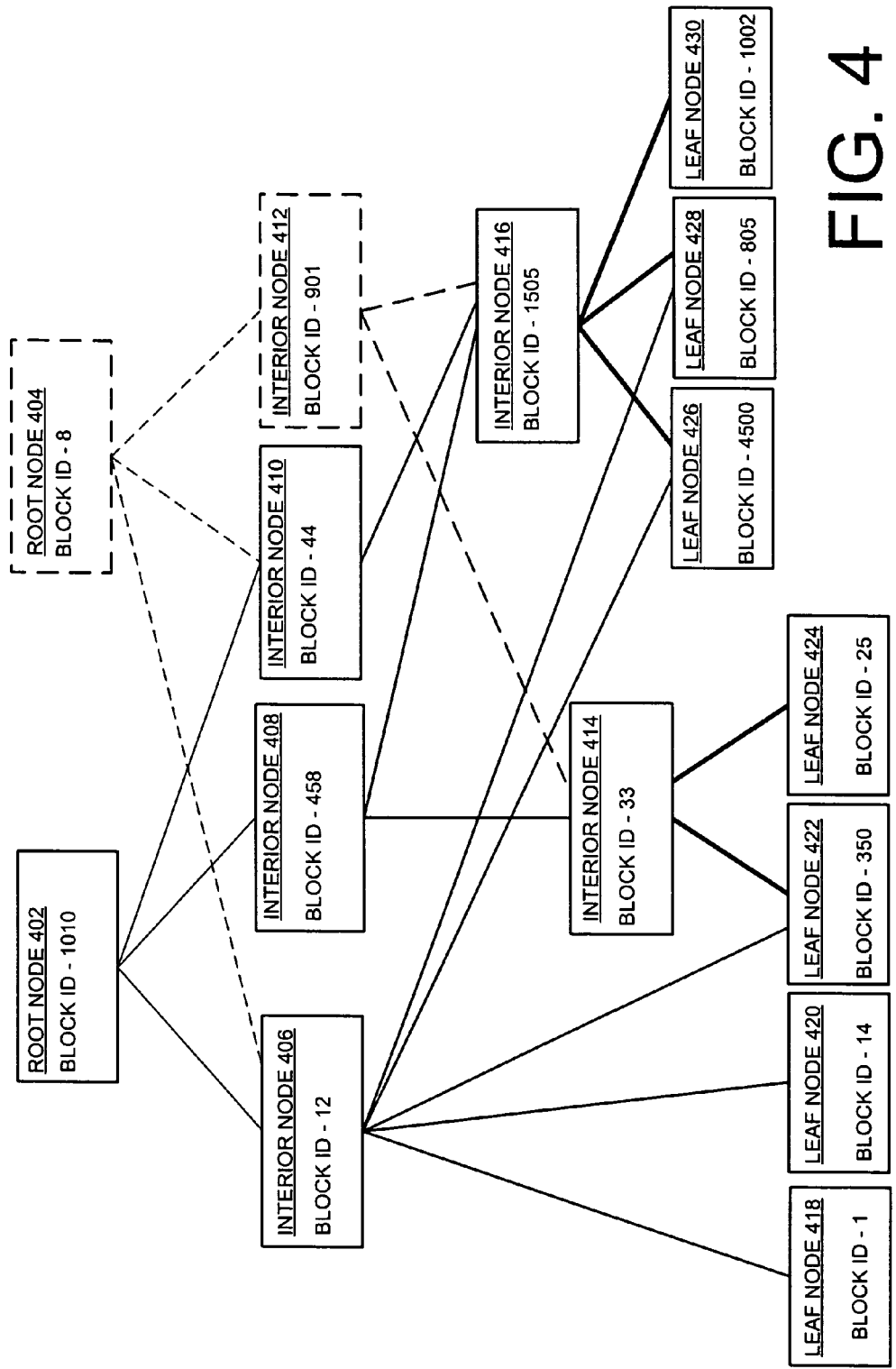
FIG. 4 illustrates a number of storage trees of blocks of data on which garbage collection operations are performed, according to one embodiment of the invention.

FIG. 4 illustrates a number of storage trees of blocks of data on which garbage collection operations are performed, according to one embodiment of the invention. In one embodiment, the storage trees of the blocks of data are snapshots of the target data 102 over time. As shown, the storage trees of the blocks of data 108 overlap, thereby illustrating that the blocks of data 108 may be shared across different storage trees.

The storage trees include two types of data: (1) user-generated data, which is stored at the leaf nodes of the storage trees; and (2) system-generated data, which is stored at the root nodes and interior nodes of the storage trees. The user-generated data includes the data (e.g., files, data structures, etc.) from the target data 102 that is being stored in the backup system 100. The system-generated data includes the data generated by the backup logic 124 within the backup system 100 that allows the overlapping and sharing of user-generated data, such as between and among different snapshots. For example, a part of a file could be a picture that is stored multiple times within a snapshot and/or stored across different snapshots. If the target data 102 is periodically being backed up and stored as a storage tree within the backup data 110, some data may not change between the different snapshots of the target data 102. Accordingly, instead of storing the same data multiple times, the backup logic 124 generates the system-generated data that provides multiple pointers to the same data.

The nodes of the storage tree represent blocks of data (either system-generated data or user-generated data) having block identifications, as described above in conjunction in FIG. 3. As shown, FIG. 4 illustrates two different storage trees that share system-generated data and user-generated data. A first storage tree includes a root node 402 having a block identification of 1010. The root node 402 references/points to an interior node 406 having a block identification of 12, an interior node 408 having a block identification of 458 and an interior node 410 having a block identification of 44.

The interior node 406 references a leaf node 418 having a block identification of 1, a leaf node 420 having a block identification of 14, a leaf node 422 having a block identification of 350, a leaf node 426 having a block identification of 4500, a leaf node 428 having a block identification of 805. The interior node 408 references an interior node 414 having a block identification of 33 and an interior node 416 having a block identification of 1505. The interior node 410 references the interior node 416. The interior node 414 references the leaf node 422 and a leaf node 424 having a block identification of 25. The interior node 416 references the leaf node 426, the leaf node 428 and a leaf node 430 having a block identification of 1002.

The second storage tree includes a root node 404 having a block identification of 8. The root node 404 references the interior node 406, the interior node 410 and an interior node 412 having a block identification of 901. The interior node 412 references the interior node 414 and the interior node 416. The interior node 414 references the leaf node 422 and the leaf node 424. The interior node 416 references the leaf node 426, the leaf node 428 and the leaf node 430. As shown, the second storage tree shares a number of different nodes with the first storage tree, in which the new nodes are noted with dashed-lines.

Therefore, as shown, two different nodes from two different storage trees may reference a same node (see the interior node 408 of the first storage tree and the interior node 412 of the second storage tree both referencing the interior node 414). Further, two different nodes of a same storage tree reference a same node in the same storage tree (see the interior node 406 and the interior node 414 referencing the leaf node 422). Additionally, two different nodes from a same file in a storage tree reference a same node in the storage tree. For example, assume that the interior node 410 and the interior node 412 are from a same file. Accordingly, these two different nodes both reference the interior node 416. In an embodiment (not shown by FIG. 4), one node makes multiple references to a given node. For example, the interior node 414 could reference the leaf node 424 multiple times. Accordingly, if the leaf node were picture/text that is repeated multiple times in a given file, the picture/text could be stored once within the storage tree and referenced multiple times. It should be understood that different embodiments may allow for one or more different ones of these types of node references.

Bloom Filter-Based Garbage Collection Operations

Figure 5A:
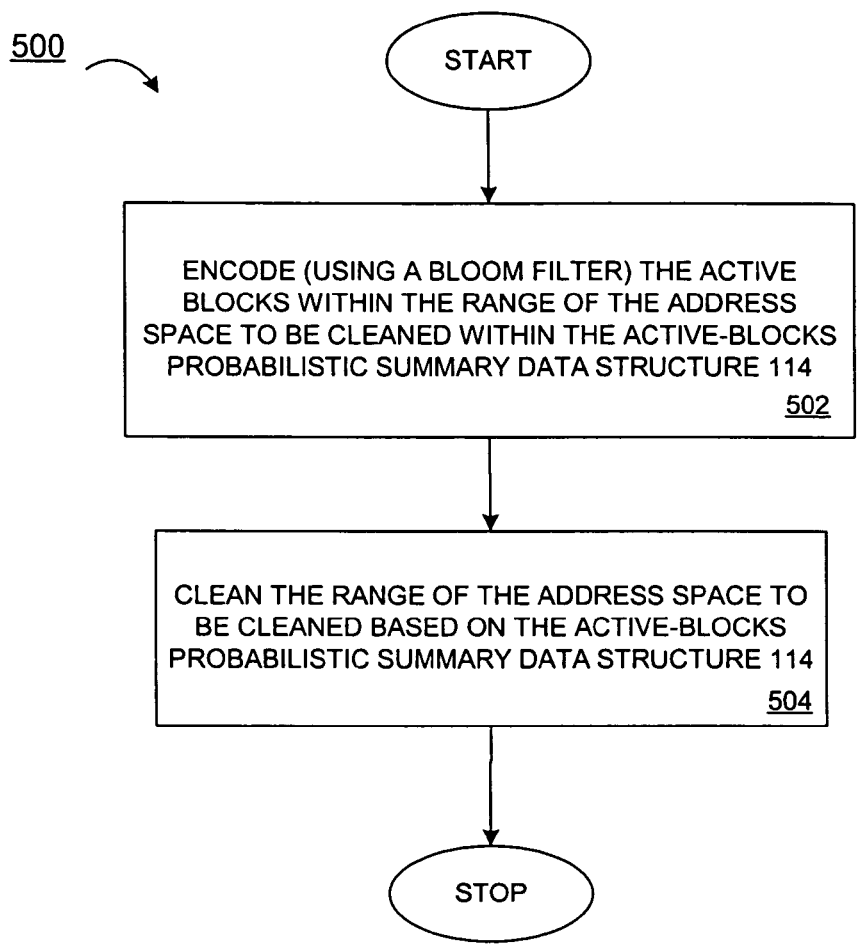
FIG. 5A illustrates a flow diagram for a Bloom filter-based garbage collection of data in a secondary storage, according to one embodiment of the invention.
Figure 5B:
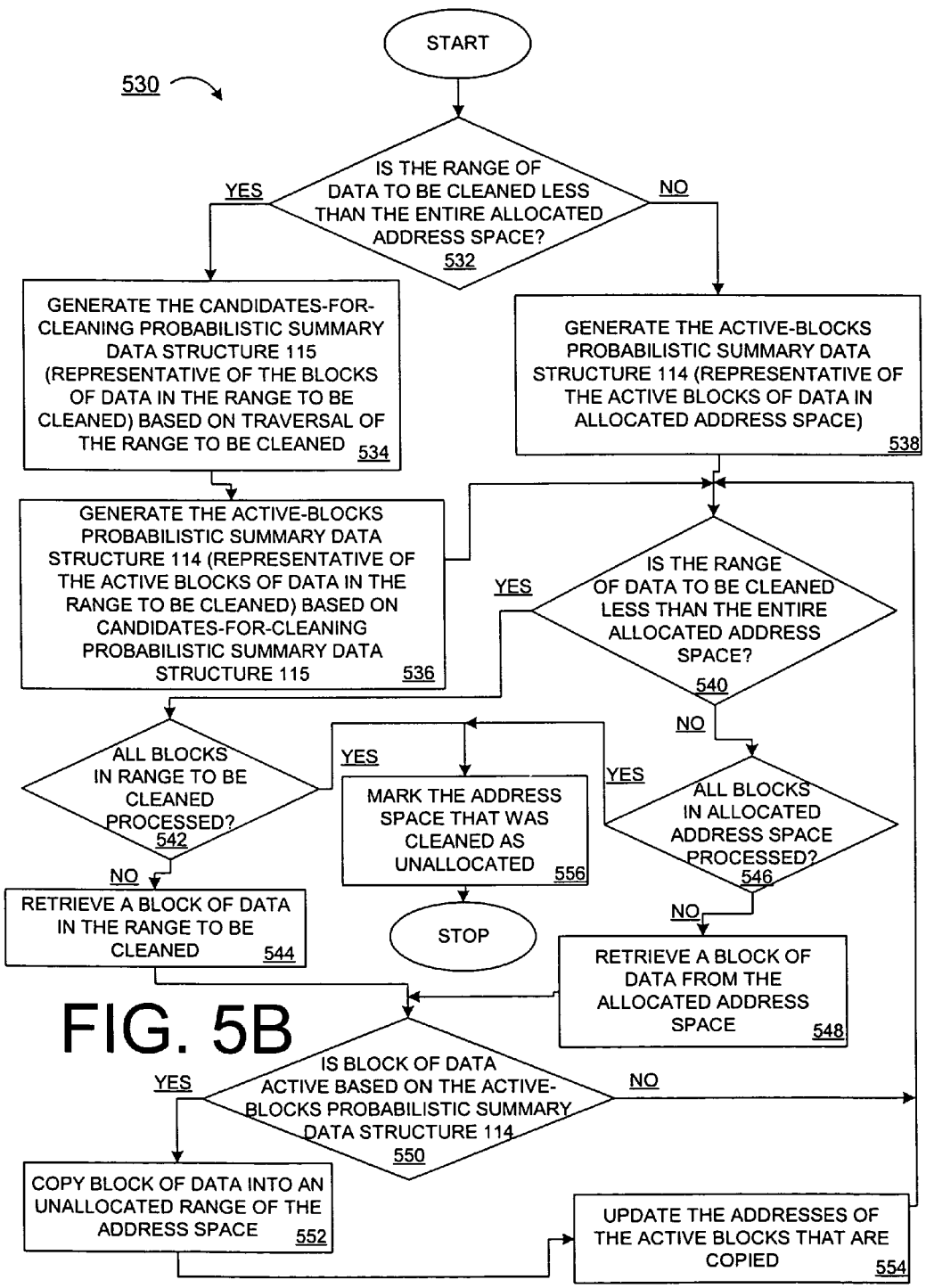
FIG. 5B illustrates a more detailed flow diagram for a Bloom filter-based garbage collection of data in a secondary storage, according to one embodiment of the invention.
Figure 5C:
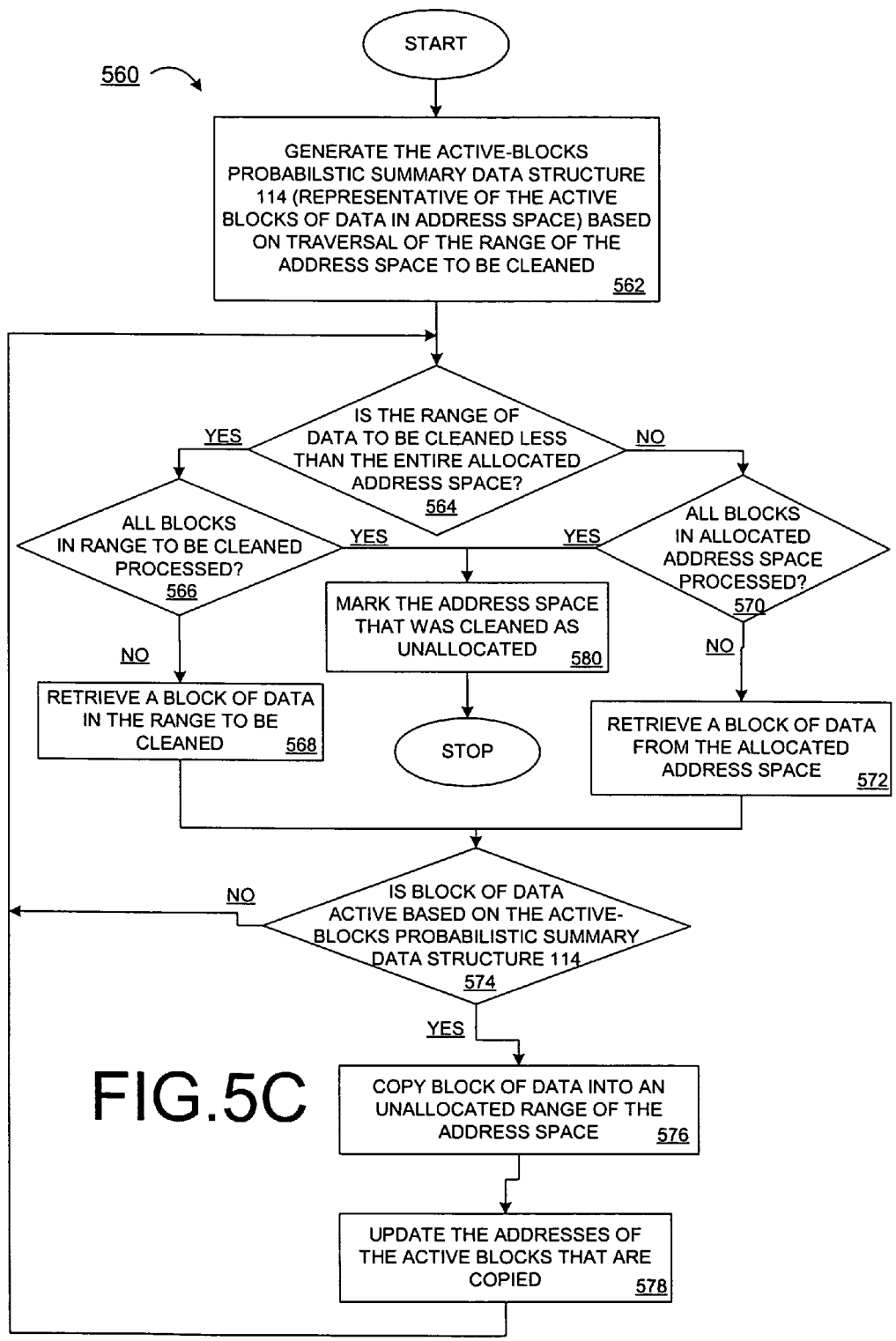
FIG. 5C illustrates a more detailed flow diagram for a Bloom filter-based garbage collection of data in a secondary storage, according to one embodiment of the invention.

The operations of the backup system 100 will now be described. FIGS. 5A-5C illustrate flow diagrams for Bloom filter-based garbage collection of data in a secondary storage, according to embodiments of the invention. FIG. 5A illustrates a flow diagram for a Bloom filter-based garbage collection of data in a secondary storage, according to one embodiment of the invention.

In block 502 of the flow diagram 500, the active blocks within the range of the address space to be cleaned are encoded within the active-blocks probabilistic summary data structure 114. With reference to the backup system 100 of FIG. 1, the Bloom filter logic 104 encodes the active blocks within the range of the address space to be cleaned within the active-blocks probabilistic summary data structure 114. Returning to FIG. 4 to help illustrate, assume that the leaf node 418 stores user-generated data that is updated. Accordingly, a new leaf node is generated and the reference by the interior node 406 is updated to reference the new leaf node. Therefore, the leaf node 418 is no longer referenced by any other block within the backup data 110 and is considered not active. The Bloom filter logic 104, therefore, encodes those blocks of data within the range of the address space to be cleaned that are referenced or are root nodes of a storage tree that is still being maintained with the backup data 110. Accordingly, the Bloom filter logic 104 locates the active blocks within the backup data 110 based on a traversal of the storage tress of blocks of data 108 that are still active/maintained within the backup data 110. In other words, the active blocks are those blocks associated with nodes of the storage trees of blocks of data 108 that are still being maintained within the backup data 110.

In one embodiment, the range of address space to be cleaned is less than the entire allocated address space of the backup data 110. In particular, the garbage collection logic 106 is to clean a selected range of an allocated address space (which could be less than all of the allocated address space) within the backup data 110. In other words, the garbage collection logic 106 is to move/delete blocks of data within a given address space of the backup data 110 that is no longer being used. As described above, in an embodiment, the backup system 100 is such that the data stored in the backup data 110 is not modifiable. Accordingly, when data within a block is modified, a new block is created within the backup data 110 for storage of the modified data (not modifying the current block of data). As described, over time, a number of blocks of data will be considered unused, and therefore, the backup data 110 will need to be cleaned to delete blocks of data not referenced.

In one embodiment if the range of the allocated address space to be cleaned is less than the entire allocated address space, the Bloom filter logic 104 uses the candidates-for-cleaning probabilistic summary data structure 115 to determine if the active block is within the range of the allocated address space to be cleaned. In an embodiment, the candidates-for-cleaning probabilistic summary data structure 115 is generated based on a Bloom filter (which is described in more detail below in conjunction with FIGS. 6A-6B). A more detailed description of this use of the candidates-for-cleaning probabilistic summary data structure 115 is described below in conjunction with FIG. 5B.

In one embodiment, the garbage collection logic 106 is to clean a range of the allocated address space that has been stored within the backup system 100 for the longest period of time. For example, the garbage collection logic 106 could be configured to clean the 100 Gigabytes that has been stored in the backup data 110 the longest in comparison to the other data therein. In another embodiment, the garbage collection logic 106 is to clean a range of the address space within the backup data 110 based on when the data was stored therein. For example, the garbage collection logic 106 is to clean a range of the address space for data stored within the backup data in a given month of a given year. In an embodiment, the garbage collection logic 106 is to clean a range of the address space of the backup data 110 associated with a storage tree. Accordingly, the address space for the blocks of data within a given storage tree is cleaned. As described, the range of the address space to be cleaned may or may not be contiguous within the backup data 110.

The encoding of the active blocks within the range of the allocated address space to be cleaned within the active-blocks probabilistic summary data structure 114 and the encoding of all the blocks within the range of the allocated address space to be cleaned within the candidates-for-cleaning probabilistic summary data structure 115, by the Bloom filter logic 104, based on a Bloom filter will now be described in conjunction with FIGS. 6A-6B. In particular, the generation and use of the probabilistic summary data structure 114/115 based on a Bloom filter will now be described. FIGS. 6A-6B illustrate a Bloom filter for garbage collection of data in a secondary storage, according to embodiments of the invention. FIGS. 6A-6B illustrate the incorporation of a Bloom filter into garbage collection of data in a secondary storage based on different configurations of hash logic. By way of example and not by way of limitation, FIGS. 6A-6B illustrate the inputting of only two different block identification/data (block ID/data 606 and 608) into the hash logic 650 and 602.

While in one embodiment the encoding of the blocks of data is an encoding of a block identification (such as a number that is sequentially assigned as the blocks of data are stored in the backup data 110). Alternatively, embodiments encode something different as the block identification (e.g., a hash or fingerprint of the block of data, a time stamp of when the data is initially stored in the backup data 110). In an embodiment, embodiments encode the data within the block itself.

Prior to the operations illustrated in FIGS. 6A-6B, the probabilistic summary data structure 114/115 is initialized to zero. After the hash logic sets the bits based on the different input, the probabilistic summary data structure 114/115 is a signature or a pattern of bits representative of the different block ID/data inputted.

The hash logic 602A-602N and the hash logic 650 can be one to a number of different hash logic. For example, the hash logic 602 and the hash logic 650 may be Message Digest (MD)5, Secure Hash Algorithm (SHA)-1, etc. In an embodiment, the hash logic 602 and/or the hash logic 650 is a selection of a number of the bits of the input (e.g., all of the even bits). In one embodiment, the hash logic 602 and/or the hash logic 650 is a rearrangement of the bits of the input. In one embodiment, the hash logic 650 is a relatively more complex hash operation, such as an MD5 hash, while the different hash logic 602A-602N are selections and/or rearrangements of the number of bits of inputted.

With regard to FIG. 6A, in operation, the hash logic 602A, the hash logic 602B, the hash logic 602C and the hash logic 602N are coupled to receive a block ID/data 606 and a block ID/data 608. Each of the hash logic 602A-602N generates a value that is an offset into the probabilistic summary data structure 114/115. Accordingly, the bit at the offset generated by each of the hash logic 602A-602N is set. As shown, the hash logic 602A generates an offset value at a bit 620 of the probabilistic summary data structure 114/115 for the block ID/data 606. Therefore, the hash logic 602A sets the bit 620 of the probabilistic summary data structure 114/115. In particular, assume that the hash logic 602A generates a hash value of 20 and that the bit 620 is at an offset of 20 within the probabilistic summary data structure 114/115. Accordingly, the hash logic 602A sets the bit 620.

The hash logic 602B generates an offset value at a bit 616 of the probabilistic summary data structure 114/115 for the block ID/data 606. The hash logic 602B sets the bit 616 of the probabilistic summary data structure 114/115. The hash logic 602C generates an offset value at a bit 618 of the probabilistic summary data structure 114/115 for the block ID/data 606. The hash logic 602C sets the bit 618 of the probabilistic summary data structure 114/115. The hash logic 602N generates an offset value at a bit 612 of the probabilistic summary data structure 114/115 for the block ID/data 606. The hash logic 602N sets the bit 612 of the probabilistic summary data structure 114/115.

The hash logic 602A generates an offset value at a bit 610 of the probabilistic summary data structure 114/115 for the block ID/data 608. Therefore, the hash logic 602A sets the bit 610 of the probabilistic summary data structure 114/115. The hash logic 602B generates an offset value at a bit 622 of the probabilistic summary data structure 114/115 for the block ID/data 608. The hash logic 602B sets the bit 622 of the probabilistic summary data structure 114/115. The hash logic 602C generates an offset value at a bit 614 of the probabilistic summary data structure 114/115 for the block ID/data 608. The hash logic 602C sets the bit 614 of the probabilistic summary data structure 114/115. The hash logic 602N generates an offset value at a bit 618 of the probabilistic summary data structure 114/115 for the block ID/data 608. The bit 618 has already been set by the hash logic 602C for the block ID/data 606.

With regard to FIG. 6B, in operation, the hash logic 650 is coupled to receive the block ID/data 606 and the block ID/data 608. The outputted hash from the hash logic 650 is inputted into each of the hash logic 602A-602N. As shown, the hash logic 602A generates an offset value at a bit 662 of the probabilistic summary data structure 114/115 for the block ID/data 606. Therefore, the hash logic 602A sets the bit 662 of the probabilistic summary data structure 114/115.

The hash logic 602B generates an offset value at a bit 658 of the probabilistic summary data structure 114/115 for the block ID/data 606. The hash logic 602B sets the bit 658 of the probabilistic summary data structure 114/115. The hash logic 602C generates an offset value at a bit 654 of the probabilistic summary data structure 114/115 for the block ID/data 606. The hash logic 602C sets the bit 654 of the probabilistic summary data structure 114/115. The hash logic 602N generates an offset value at a bit 652 of the probabilistic summary data structure 114/115 for the block ID/data 606. The hash logic 602N sets the bit 652 of the probabilistic summary data structure 114/115.

The hash logic 602A generates an offset value at a bit 656 of the probabilistic summary data structure 114/115 for the block ID/data 608. Therefore, the hash logic 602A sets the bit 656 of the probabilistic summary data structure 114/115. The hash logic 602B generates an offset value at a bit 664 of the probabilistic summary data structure 114/115 for the block ID/data 608. The hash logic 602B sets the bit 664 of the probabilistic summary data structure 114/115. The hash logic 602C generates an offset value at a bit 660 of the probabilistic summary data structure 114/115 for the block ID/data 608. The hash logic 602C sets the bit 660 of the probabilistic summary data structure 114/115. The hash logic 602N generates an offset value at the bit 662 of the probabilistic summary data structure 114/115 for the block ID/data 608. The bit 662 has already been set by the hash logic 602A for the block ID/data 606.

While, in one embodiment, a given hash logic 602 (hash logic 602A) generates a unique value that is an offset into the probabilistic summary data structure 114/115, in an embodiment, two different hash logics may collide by generating a same offset value for two different block ID/data. For example, as illustrated, the hash logic 602C generates a same offset value for the block ID/data 606 as the hash logic 602N for a different block ID/data (the block ID/data 608).

Returning to the flow diagram 500 of FIG. 5A, the Bloom filter logic 104 inputs the block identifications or the data within the blocks for each of the active blocks within the address space to be cleaned into a Bloom filter to generate the active-blocks probabilistic summary data structure 114. Accordingly, the active-blocks probabilistic summary data structure 114 is an encoded value representative of the active blocks within the address space to be cleaned.

Moreover, as described above, in an embodiment, less than the entire allocated address space is cleaned. Accordingly, in an embodiment, upon determining that a block is active, the Bloom filter logic 104 determines whether the block is within the range to be cleaned. In one embodiment, the Bloom filter logic 104 uses the candidates-for-cleaning probabilistic summary data structure 115 to determine if the active block is within the range of the address space to be cleaned. The Bloom filter logic 104 inputs the block identification/data into the hash logic for the Bloom filter that generated the candidates-for-cleaning probabilistic summary data structure 115. If one of the bits at the offsets (outputted from the hash logic) is set to zero, the block is not within the range of the address space to be cleaned. Conversely, if all of the bits at the offsets (outputted from the hash logic) are set to one, the block is considered to be within the range of the address space to be cleaned.

Moreover, if there is a match (i.e., if all of the bits at the offsets are set to one), there is not an absolute certainty that the block is considered to be encoded in the candidates-for-cleaning probabilistic summary data structure 115. In particular, collisions across the output of different hash logic may provide a false indication that a given block ID/data is encoded within the probabilistic summary data structure 114/115. Returning to FIG. 6A to help illustrate, assume that a block ID/data is inputted into each of the hash logic 602A-602N to determine if the block ID/data is encoded within the probabilistic summary data structure 114/115. For this inputted block ID/data, assume that the output from the hash logic 602A is at an offset for the bit 614 (which was set by the hash logic 602C for the block ID/data 608). Furthermore, for this inputted block ID/data, assume that the output from the hash logic 602B is at an offset for the bit 610 (which was set by the hash logic 602A for the block ID/data 608). For this inputted block ID/data, assume that the output from the hash logic 602C is at an offset for the bit 612 (which was set by the hash logic 602N for the block ID/data 606. For this inputted block ID/data, assume that the output from the hash logic 602N is at an offset for the bit 622 (which was set by the hash logic 602B for the block ID/data 608). Accordingly, even though this different ID/data was not inputted into the hash logic 602A-

602N for the generation of the probabilistic summary data structure 114/115, the probabilistic summary data structure 114/115 provides a false indication as that this different ID/data is encoded therein based on the setting of bits by the hash logic for other block ID/data.

Accordingly, the garbage collection operations described herein are approximations that serve as a trade off for allowing a single encoded value to be stored in local memory for potentially faster operations. Therefore, the cost of allowing the single encoded value to be stored in local memory is the erroneous marking of a limited number of blocks of data as being within the range of the address space to be cleaned, while allowing for a potential increase in the rate of garbage collection operations (whose relative potential grows in comparison to conventional approaches as the amount of data on which garbage collection operations are being performed grows). Moreover, the probability of receiving an erroneous match based on the probabilistic summary data structure 114/115 depends on the size of the probabilistic summary data structure 114/115 relative to the number of block ID/data that are inputted therein as well as the number of hash logic for the Bloom filter.

Returning to block 502, once the active block is considered to be within the range of the address space to be cleaned, the Bloom filter logic 104 encodes the active block within the active-blocks probabilistic summary data structure 114 based on a different Bloom filter operation. The encoding, by the Bloom filter logic 104, of the active blocks within the range of the address space to be cleaned within the active-blocks probabilistic summary data structure 114 based on a Bloom filter has been described in conjunction with FIGS. 6A-6B. Control continues at block 504.

In block 504, the range of the address space to be cleaned is cleaned based on the active-blocks probabilistic summary data structure 114. With reference to the backup system 100 of FIG. 1, the garbage collection logic 106 cleans the range of the address space to be cleaned within the backup data 110 based on the active-blocks probabilistic summary data structure 114. In one embodiment, the garbage collection logic 106 cleans the range of the address space to be cleaned within the backup data 110 by copying the active blocks within the range of the address space to be cleaned to an unallocated part of the address space within the backup storage device 208 and marking this range of the address space as unallocated. Accordingly, the backup logic 124 can store new backup data within this range of the address space.

However, embodiments of the invention are not so limited. In another embodiment, the garbage collection logic 106 marks (based on the probabilistic summary data structures 114/115) the inactive blocks within the range of the address space to be cleaned as unallocated. Accordingly, the backup logic 124 can store new backup data within these unallocated sections of the range of the address space to be cleaned. In one embodiment, the garbage collection logic 106 moves the active blocks of data within this range of the address space, such that the active blocks of data remain in this address space and are stored contiguously therein.

More detailed embodiments of the use of a Bloom filter for garbage collection will now be described in conjunction with FIGS. 5B-5C. FIG. 5B illustrates a more detailed flow diagram for a Bloom filter-based garbage collection of data in a secondary storage, according to one embodiment of the invention. The flow diagram 530 of FIG. 5B illustrates a mark-and-sweep garbage collection operation that includes a Bloom filter for the active blocks of data to be cleaned and possibly a second Bloom filter for the blocks of data in a range of an address space of the secondary storage to be cleaned. As will be described, the operations in blocks 532-538 are related to the marking operations, while the operations in blocks 540-550 are related to the sweeping operations.

In block 532, a determination is made of whether the range of data to be cleaned is less than the entire allocated address space of the backup data 110. With reference to the backup system 100, the garbage collection logic 106 determines whether the range of data to be cleaned is less than the entire allocated address space of the backup data 110. As described above, a targeted range, such as a range of blocks of data that have resided in the backup data 110 for the longest period of time, will be selected for cleaning.

In block 534, upon determining that the range of data to be cleaned is less than the entire allocated address space of the backup data 110, the candidates-for-cleaning probabilistic summary data structure 115 (representative of the blocks of data in the range to be cleaned) is generated based on a traversal of the range to be cleaned. With reference to the backup system 100, the Bloom filter logic 104 generates the candidates-for-cleaning probabilistic summary data structure 115 based on a traversal of the range to be cleaned. As described above, the Bloom filter logic 104 generates the candidates-for-cleaning probabilistic summary data structure 115 by inputting the data within the blocks within the range to be cleaned or identifications of such blocks into a Bloom filter (such as the Bloom filters illustrated in FIGS. 6A-6B).

The Bloom filter logic 104 walks the address space for the range to be cleaned and locates the blocks in this address space. In an embodiment, the backup data 110 is stored as a logical log having a number of records. A record in a logical log stores a block of data and a header that includes information about the block of data (such as the size of the record, the size of the block of data, a block identification, a time stamp of when the block was stored in the logical log, etc.). A more detailed description of a logical log is described below in conjunction with FIG. 9. Returning to block 534, when the backup data 110 is a logical log, the Bloom filter logic 104 walks the records of the range to be cleaned and inputs the block ID/data for each of the blocks in the range of the address space to be cleaned. Control continues at block 536.

In block 536, the active-blocks probabilistic summary data structure 114 (representative of the active blocks of data in the range to be cleaned) is generated based on the candidates-for-cleaning probabilistic summary data structure 115. With reference to the backup system 100, the Bloom filter logic 104 generates the active-blocks probabilistic summary data structure 114 based on the candidates-for-cleaning probabilistic summary data structure 115. As describe above in conjunction with FIG. 5A, the Bloom filter logic 104 locates the active blocks within the backup data 110 based on a traversal of the storage tress of blocks of data 108 that are still active/maintained within the backup data 110.

Moreover, when an active block has been located, the Bloom filter logic 104 inputs the block ID/data for this active block into the Bloom filter that generated the candidates-for-cleaning probabilistic summary data structure 115 to determine if the active block is within the range to be cleaned. As described above in conjunction with FIGS. 6A-6B, if the output from each of the hash logic 602 of this Bloom filter is such that the offsets into the candidates-for-cleaning probabilistic summary data structure 115 are set to one, the block is considered to be encoded within the candidates-for-cleaning probabilistic summary data structure 115 and thus a block in the range to be cleaned.

If the block is within the range to be cleaned, the Bloom filter logic 104 inputs the block ID/data for this block into a different Bloom filter to generate the active-blocks probabilistic summary data structure 114. After the storage trees of the blocks of data 108 that are still maintained have been traversed and the active blocks of data within the range to be cleaned are inputted into the different Bloom filter to generate the active-blocks probabilistic summary data structure 114, control continues at block 540 (which is described below).

In block 538, upon determining that the range of data to be cleaned is the entire allocated address space of the backup data 110, the active-blocks probabilistic summary data structure 114 is generated (representative of the active blocks of data in the entire allocated address space of the backup data 110). With reference to the backup system 100, the Bloom filter logic 104 generates the active-blocks probabilistic summary data structure 114. Similar to the generation of the active-blocks probabilistic summary data structure 114 in block 536, the Bloom filter logic 104 locates the active blocks within the backup data 110 based on a traversal of the storage tress of blocks of data 108 that are still active/maintained within the backup data 110. However, because the entire allocated address space is being cleaned, the candidates-for-cleaning probabilistic summary data structure 115 is not required. Therefore, when active blocks are located based on the traversal of the storage trees of blocks of data 108, the Bloom filter logic 104 inputs the block ID/data for these active blocks into the Bloom filter for the active blocks to generate the active-blocks probabilistic summary data structure 114 (as described above in conjunction with FIGS. 6A-6B). Control continues at block 540.

In block 540, a determination is again made of whether the range of data to be cleaned is less than the entire allocated address space of the backup data 110. With reference to the backup system 100, the garbage collection logic 106 determines whether the range of data to be cleaned is less than the entire allocated address space of the backup data 110.

In block 542, upon determining that the range of data to be cleaned is less than the entire allocated address space of the backup data 110, a determination is made of whether all blocks of data in the range to be cleaned have been processed. With reference to the backup system 100, the garbage collection logic 106 determines whether all blocks of data in the range to be cleaned have been processed. Within the operations of blocks 540-544 and 550-554, the garbage collection logic 106 traverses the blocks of data within the range of the address space to be cleaned. Accordingly, the garbage collection logic 106 tracks when such operations have been performed for all of the blocks of data within the range to be cleaned. Upon determining that all of the blocks in the range have been processed, control continues at block 556 (which is described in more detail below).

In block 544, upon determining that all of the blocks of data within the range to be cleaned have not been processed, a block of data within the range to be cleaned is retrieved. With reference to the backup system 100, the garbage collection logic 106 retrieves a block of data within the range to be cleaned. In an embodiment, in order to reduce the number of disk accesses, the garbage collection logic 106 retrieves a plurality of blocks of data within the range to be cleaned from the backup storage device 208 during a single disk access and stores these blocks of data within the memory 216. The garbage collection logic 106 then processes the blocks of data as described below and retrieves additional blocks of data during a subsequent disk access when the blocks of data, which have already been retrieved, have been processed. Accordingly, this reduces the number of disk accesses during the garbage collection operations. Control continues at block 550 (which is described in more detail below).

In block 546, upon determining that the range of data to be cleaned is not less than the entire allocated address space of the backup data 110, a determination is made of whether all blocks of data in the allocated address space have been processed. With reference to the backup system 100, the garbage collection logic 106 determines whether all blocks of data in the allocated address space have been processed. Within the operations of blocks 540 and 546-554, the garbage collection logic 106 traverses the blocks of data within the allocated address space. Accordingly, the garbage collection logic 106 tracks when such operations have been performed for all of the blocks of data within the allocated address space. Upon determining that all of the blocks in the allocated address space have been processed, control continues at block 556 (which is described in more detail below).

In block 548, upon determining that all of the blocks of data within the allocated address space have not been processed, a block of data within the allocated address space is retrieved. With reference to the backup system 100, the garbage collection logic 106 retrieves a block of data within the allocated address space. Control continues at block 550.

In block 550, a determination is made of whether the retrieved block of data is active based on the active-blocks probabilistic summary data structure 114. With reference to the backup system 100, the garbage collection logic 106 determines whether the retrieved block of data is active based on the active-blocks probabilistic summary data structure 114. In order to make this determination, the garbage collection logic 106 inputs the block identification/data for this block of data into the hash logic for the Bloom filter that generated the active-blocks probabilistic summary data structure 114. If one of the bits at the offsets (outputted from the hash logic) is set to zero, the block is not active. Conversely, if all of the bits at the offsets (outputted from the hash logic) are set to one, the block is active. In other words, the garbage collection logic 106 compares the outputted value of the Bloom filter for the retrieved blocks with the active-blocks probabilistic summary data structure 114 to determine if the blocks are active. Upon determining that the retrieved block of data is not active, control continues at block 540.

In block 552, upon determining that the retrieved block of data is active, the block of data is copied into an unallocated range of the address space of the backup data 110. With reference to the backup system 100, the garbage collection logic 106 copies the block of data to an unallocated range of the address space of the backup data 110. Control continues at block 554.

In block 554, the address of the block that is copied is updated. With reference to the backup system 100, the garbage collection logic 106 updates the address of the block that is copied. As described above, the location table 112 includes an identification of a block of data that is associated with the address of the block. Accordingly, the garbage collection logic 106 updates the address of the block by updating the address of the block in the location table 112. Control continues at block 540.

In block 556, when all of the blocks of data within the range to be cleaned (from block 542) or the blocks of data within the allocated address space (from block 546) are processed, the address space that was cleaned in the backup data 110 is marked as unallocated. With reference to the backup system 100, the garbage collection logic 106 marks this address space that was cleaned in the backup back data 110 as unallocated. Accordingly, all of the blocks of data within this address space (including the inactive blocks that were not copied and the active blocks that were copied) can be overwritten by other data to be backed up within the backup system 100 by the backup logic 124.

As described, instead of marking each block of data with its own private bit or set of bits, embodiments of the invention generate a single encoded value representative of each of the blocks of data, wherein a size of the encoded value is such that the encoded value can be stored within a local memory of the backup system 100. Accordingly, during the garbage collection operations described above, disk or secondary storage accesses are not required to retrieve this encoded value, thereby potentially increasing the speed of the garbage collection operations in comparison to conventional garbage collection operations, especially for backup systems having a large amount of data.

FIG. 5C illustrates a more detailed flow diagram for a Bloom filter-based garbage collection of data in a secondary storage, according to another embodiment of the invention. The flow diagram 560 of FIG. 5C illustrates a mark-and-sweep garbage collection operation that includes a Bloom filter for the active blocks of data and independent of a second Bloom filter for the blocks of data in a range of an address space of the secondary storage to be cleaned. As will be described, the operations in block 562 are related to the marking operations, while the operations in blocks 564-580 are related to the sweeping operations.

In block 562, the active-blocks probabilistic summary data structure 114 is generated (representative of the active blocks of data in the range of the allocated address space of the backup data 110 to be cleaned). With reference to the backup system 100, the Bloom filter logic 104 generates the active-blocks probabilistic summary data structure 114 (as described above). In the embodiment illustrated in the flow diagram 560, whether the entire allocated address space or a range thereof is cleaned, the Bloom filter logic 104 generates the active-blocks probabilistic summary data structure 114 without a summary data structure representative of the blocks of data within the address space being cleaned. Accordingly, the Bloom filter logic 104 traverses the storage trees of blocks of data 108 to locate all of active blocks in the allocated address space (including potentially those blocks that are not in the range to be cleaned). The Bloom filter logic 104 inputs the block ID/data for these active blocks into the Bloom filter for the active blocks to generate the active-blocks probabilistic summary data structure 114 (as described above in conjunction with FIGS. 6A-6B). Control continues at block 564.

In block 564, a determination is made of whether the range of data to be cleaned is less than the entire allocated address space of the backup data 110. With reference to the backup system 100, the garbage collection logic 106 determines whether the range of data to be cleaned is less than the entire allocated address space of the backup data 110.

In block 566, upon determining that the range of data to be cleaned is less than the entire allocated address space of the backup data 110, a determination is made of whether all blocks of data in the range to be cleaned have been processed. With reference to the backup system 100, the garbage collection logic 106 determines whether all blocks of data in the range to be cleaned have been processed. Upon determining that all of the blocks in the range have been processed, control continues at block 580 (which is described in more detail below).

In block 568, upon determining that all of the blocks of data within the range to be cleaned have not been processed, a block of data within the range to be cleaned is retrieved. With reference to the backup system 100, the garbage collection logic 106 retrieves a block of data within the range to be cleaned. Control continues at block 574 (which is described in more detail below).

In block 570, upon determining that the range of data to be cleaned is not less than the entire allocated address space of the backup data 110, a determination is made of whether all blocks of data in the allocated address space have been processed. With reference to the backup system 100, the garbage collection logic 106 determines whether all blocks of data in the allocated address space have been processed. Upon determining that all of the blocks in the allocated address space have been processed, control continues at block 580 (which is described in more detail below).

In block 572, upon determining that all of the blocks of data within the allocated address space have not been processed, a block of data within the allocated address space is retrieved. With reference to the backup system 100, the garbage collection logic 106 retrieves a block of data within the allocated address space. Control continues at block 574.

In block 574, a determination is made of whether the retrieved block of data is active based on the active-blocks probabilistic summary data structure 114. With reference to the backup system 100, the garbage collection logic 106 determines whether the retrieved block of data is active based on the active-blocks probabilistic summary data structure 114. Upon determining that the retrieved block of data is not active, control continues at block 564.

In block 576, upon determining that the retrieved block of data is active, the block of data is copied into an unallocated range of the address space of the backup data 110. With reference to the backup system 100, the garbage collection logic 106 copies the block of data to an unallocated range of the address space of the backup data 110. Control continues at block 578.

In block 578, the address of the block that is copied is updated. With reference to the backup system 100, the garbage collection logic 106 updates the address of the block that is copied. Control continues at block 564.

In block 580, when all of the blocks of data within the range to be cleaned (from block 542) or the blocks of data within the allocated address space (from block 546) are processed, the address space that was cleaned in the backup data 110 is marked as unallocated. With reference to the backup system 100, the garbage collection logic 106 marks this address space that was cleaned in the backup back data 110 as unallocated.

Incremental Garbage Collection of Data in a Secondary Storage

System Description

Figure 7:
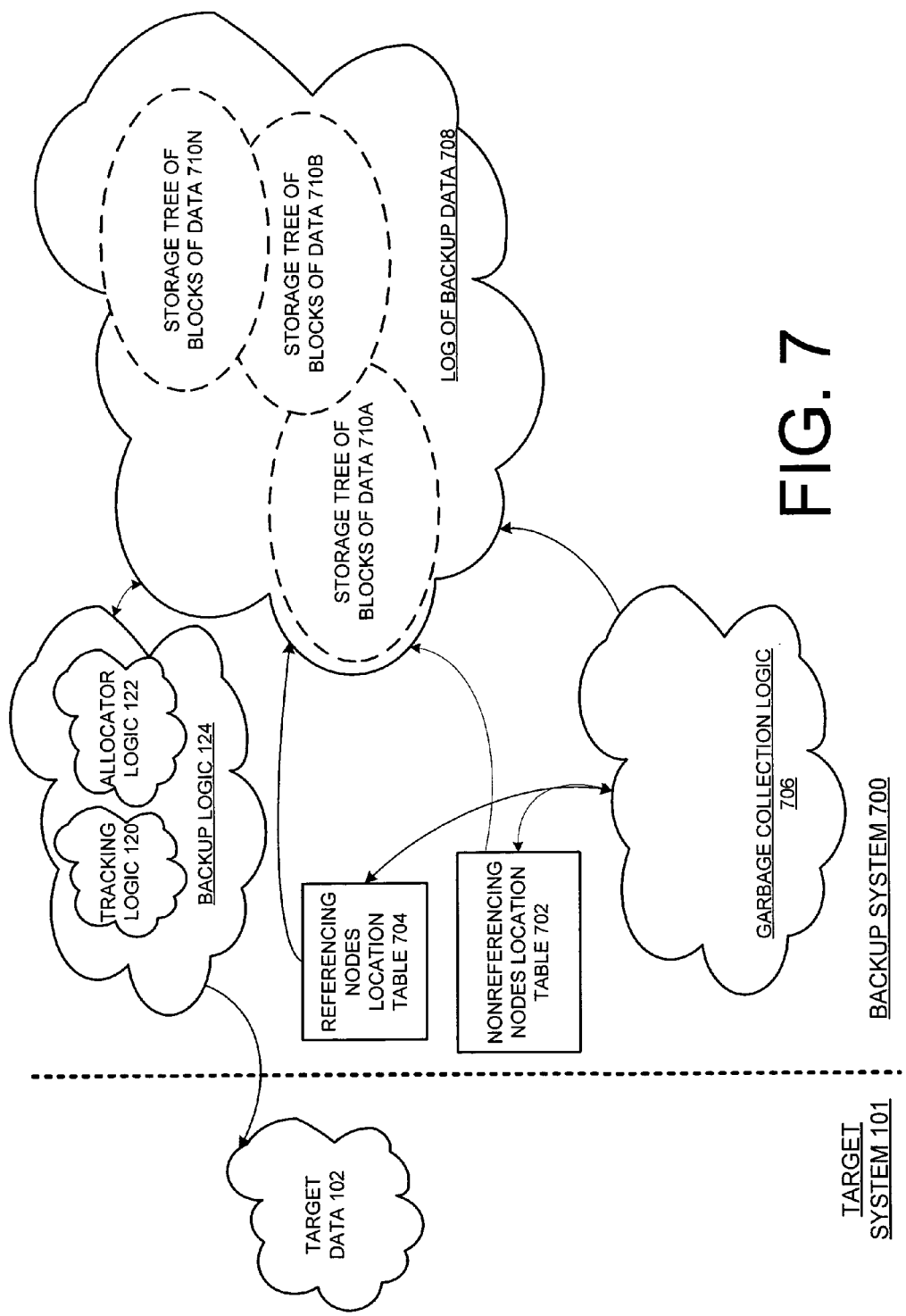
FIG. 7 illustrates a block diagram of a system that includes incremental garbage collection operations, according to one embodiment of the invention.

FIG. 7 illustrates a block diagram of a system that includes incremental garbage collection operations, according to one embodiment of the invention. These garbage collection operations are incremental in that they allow the garbage collection logic to perform mark and sweep on a range of backup storage at a time, as opposed to the entire backup storage. Similar to FIG. 1, FIG. 7 includes a backup system 700 and the target system 101. The target system 101 includes the target data 102 that is backed up/stored within and by the backup system 700. The backup system 700 includes a backup logic 124, a garbage collection logic 706, a nonreferencing nodes location table 702, a referencing nodes location table 704 and a log of backup data 708. The backup logic 124 includes a tracking logic 120 and an allocator logic 122.

As in the backup system 100, the backup system 700 includes backup data stored therein. However, the backup system 700 stores the backup data as a log(i.e., the log of backup data 708). In one embodiment (which is described in more detail below in conjunction with FIG. 9), the backup system 700 stores the backup data as a contiguous log in a sequential order, wherein the backup data is wrapped around to the beginning of the log once the end is reached and the beginning of the log has been cleaned. For example, the allocator logic 122 begins writing data into the contiguous log of backup data 708 beginning at address zero and continuing until the end of the physical address space. The allocator logic 122 wraps around to the beginning of the physical address space and begins storing the data at the physical address zero. However, embodiments of the invention are not so limited, as embodiments of the invention can incorporate any type of log having a collection of records that are laid out in order. Moreover, the order of the log is not required to be the order that the log is stored in a physical space. For example, the records of the log can be logically coupled together in an order of the log, while being stored in a different order physically in a storage device.

As further described below, the garbage collection logic 706 uses the nonreferencing nodes location table 702 and the referencing nodes location table 704 to perform incremental garbage collection of a segment of the log of backup data 708. In one embodiment, the garbage collection logic 706 cleans the segment of the log of backup data 708 that is at the tail of the log (i.e., the segment having backup data that has been stored in the storage device for the longest period of time). In one embodiment, the garbage collection operations include the identification of the referenced/active blocks of data in the segment and the copying of these referenced/active blocks of data to the head of the log of backup data 708.

The log of backup data 708 includes a number of storage trees of blocks of data 710A-710N. One embodiment of the storage trees of blocks of data 710 is described in conjunction with FIG. 4. In particular, the different nodes of the storage tress of blocks of data 710 are representative of blocks of data stored at different locations within the log of backup data 708. Similar to the blocks of data 110, in an embodiment, the backup data within the contiguous log of backup data 708 are non-modifiable.

The backup logic 124 is coupled to retrieve the target data 102 from the target system 101 and to store the target data 102 or a part thereof within the log of backup data 708. The garbage collection logic 706 is coupled to the log of backup data 708, the nonreferencing nodes location table 702 and the referencing nodes location table 704. As will be described in more detail below, similar to the location table 112, the nonreferencing nodes location table 702 and the referencing nodes location table 704 allow for a level of indirection, wherein an identification of a block of data within the log of backup data 708 is associated with an offset address within the log of backup data 708. Accordingly, such tables are used when the blocks of data are copied or moved within the contiguous log of backup data 708. Embodiments of the nonreferencing nodes location table 702 and the referencing nodes location table 704 are described in more detail below in conjunction with FIGS. 10A-10B.

Figure 8:
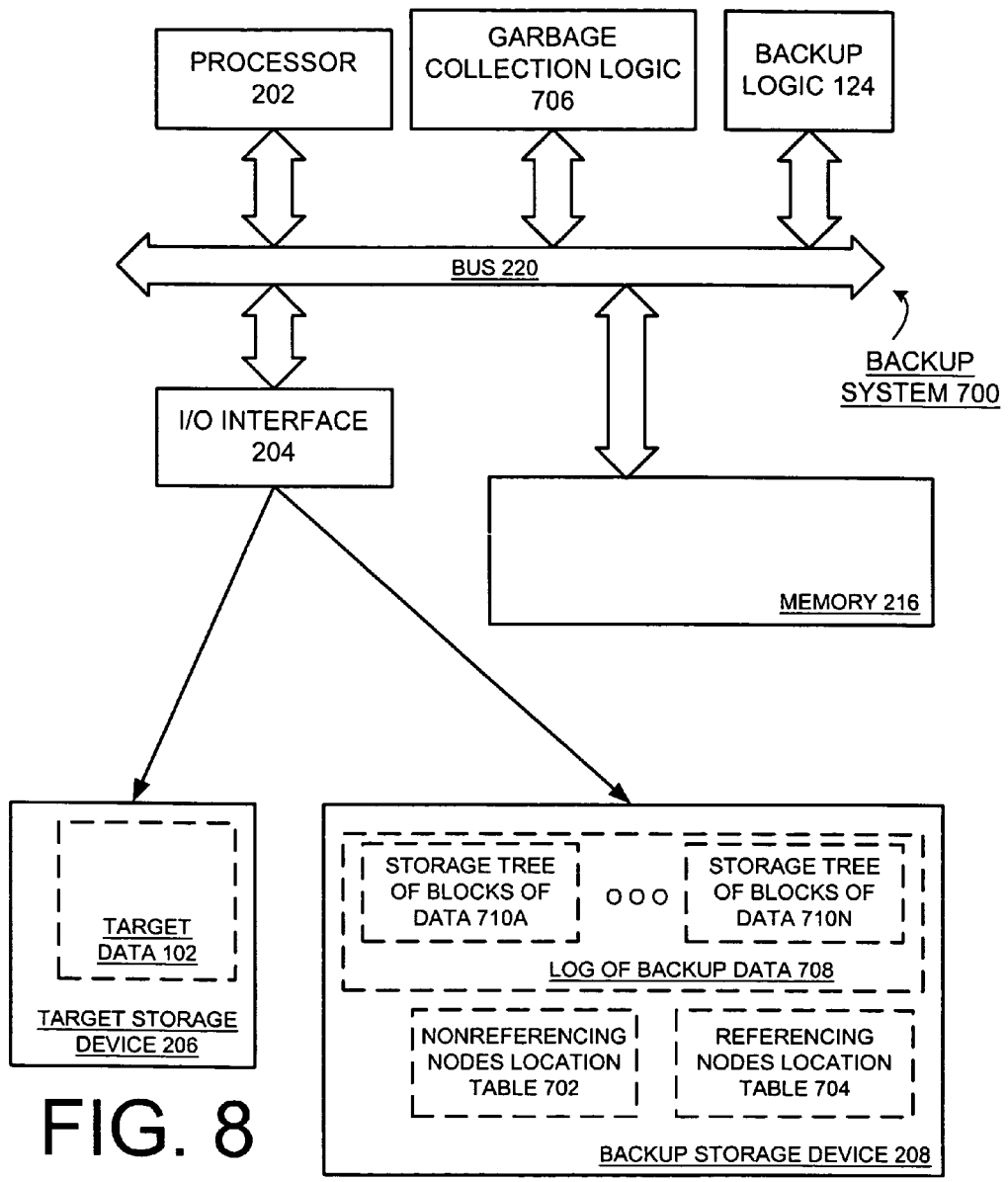
FIG. 8 illustrates a more detailed block diagram of a backup system, according to one embodiment of the invention.

FIG. 8 illustrates a more detailed block diagram of a backup system, according to one embodiment of the invention. FIG. 8 illustrates the backup system 700 that includes the processor 202, a garbage collection logic 706, the backup logic 124, the input/output (I/O) interface 204 and the memory 216 which are coupled together through the system bus 220. A number of the components of the backup system 700 are the similar to a number of components of the backup system 200 and have been described above in conjunction with FIG. 2.

For the backup system 700, the backup storage device 208 stores the log of backup data 708, the referencing nodes location table 702 and the nonreferencing nodes location table 704. Additionally, at least a part of the log of backup data 708, the referencing nodes location table 702 and the nonreferencing nodes location table 704 may be stored in the memory 216.

In an embodiment, the garbage collection logic 706 may be a process or task that can reside within the memory 216, the backup storage device 208 and/or the processor 202 and can be executed within the processor 202. However, embodiments of the invention are not so limited, as the garbage collection logic 706 may be different types of hardware (such as digital logic) executing the processing described therein (which is described in more detail below).

Figure 9:
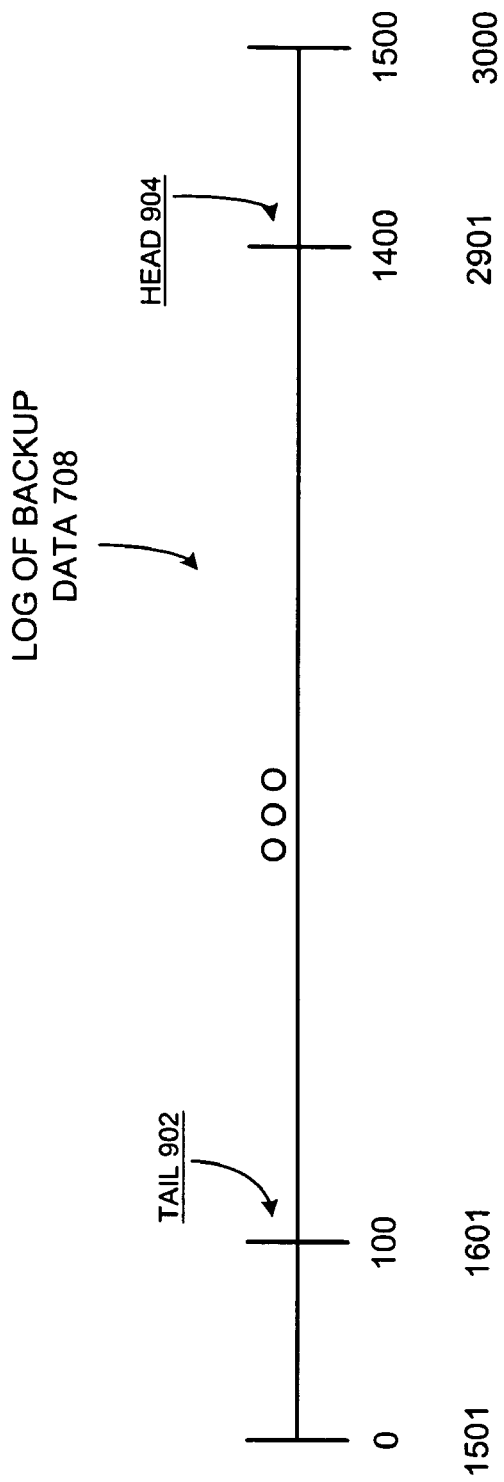
FIG. 9 illustrates a more detailed diagram of a log of backup data, according to one embodiment of the invention.

FIG. 9 illustrates a more detailed diagram of a log of backup data, according to one embodiment of the invention. In particular, FIG. 9 illustrates a more detailed diagram of the log of backup data 708, according to one embodiment of the invention. The embodiment of a log illustrated in FIG. 9 is stored physically in a sequential wrap around order. However (as described above), embodiments of the invention are not so limited, as embodiments of the invention can incorporate any type of log having a collection of records that are laid out in order.

As shown, the log of backup data 708 includes a physical address space that ranges from zero to 1500. A tail of the log of backup data 708 is shown at address 100, while a head 904 of the log of backup data 708 is shown at address 1400. As described above, the tail 902 and the head 904 move as the allocated address space of the log of backup data changes and moves over time.

The allocator logic 122 stores blocks of data in the log of backup data 708 sequentially in a wrap around order. Initially (when no data is stored in the log of backup data 708), the tail 902 and the head 904 are at address zero. The allocator logic 122 stores a first block of data at the address zero and continues storing the subsequent blocks of data at subsequent addresses. For example, if the size of the first block of data stored is such that the first 50 addresses are occupied, the second block of data is stored starting at address 51. After storage of the first block of data, the tail 902 would remain at address zero and the head 904 would be at address 51.

Moreover, once the blocks of data stored in the log of backup data 708 is such that the data occupies addresses up to 1500, the allocator logic 122 begins storing data at the beginning of the physical address space but having a logical address based on the number of times that the allocator logic 122 has wrapped around. For example, the logical address for the physical address zero after a first wrap around is 1501, the logical address for the physical address zero after a second wrap around is 3001, etc.

Accordingly, the garbage collection logic 706 is to clean segments of the address space to allow for storage of new data in such segments. In one embodiment, the garbage collection logic 706 cleans a segment of the address space at the tail 902 of the log of backup data 708. As further described below, the cleaning of the segment includes copying the referenced/active blocks of data that are within the segment to the head 904 of the log, which is considered unallocated. For example, assume that the tail 902 of the log is at address zero and that the blocks of data from address zero to address 100 are to be cleaned and that the head 904 of the log is at address 1001. The garbage collection logic 706 copies the referenced/active blocks of data within the address space between zero and 100 to the address space beginning at address 1001. Assume that the garbage collection logic 706 stores this referenced/active blocks of data from 1001 to 1100. The garbage collection logic 706 also marks the address space from zero to 100 as unallocated. Accordingly, the allocator logic 122 can store new data in this address space once storage of the data wraps back around to the beginning.

Furthermore, the tail 902 of the log is now at address 101, while the head 904 of the log is 1101. The garbage collection logic 706 can repetitively clean another segment at the tail 902 of the log and copy the referenced/active blocks within such segment to the head 904 of the log. Accordingly, as described, embodiments of the invention store data at the head 904 of the log while cleaning segments of such data at the tail 902, thereby allowing the data to be contiguously stored therein such that the data wraps around the log. Further, the addresses of the blocks of data stored in the log are defined by a logical address based on the physical address and the number of times that the data has wrapped around. For example, for a block of data stored at a physical address of 1400, the logical address after a first wrap around is 2901, the logical address after a second wrap around is 4402, etc. The operations of the storage of data into the log of backup data 708 are described in more detail below.

FIGS. 1A-10B illustrate location tables for data storage and garbage collection of such data, according to one embodiment of the invention. In particular, FIG. 10A illustrates the nonreferencing nodes location table 702 while FIG. 10B illustrates the referencing nodes location table 704 for data storage and garbage collection of such data, according to one embodiment of the invention. While describe as two separate tables, the nonreferencing nodes location table 702 and the referencing nodes location table 704 may be one table, wherein the entries will include the three columns illustrated in the referencing nodes location table 704 such that entries having nonreferencing nodes will leave the minimum offset column 1010 a value representing a non-referencing node (e.g., the initialization value).

With regard to FIG. 10A, similar to the location table 112 of FIG. 3, the nonreferencing nodes location table 702 includes a block identification column 1002 and an address column (an offset address column 1004). The block identification column 1002 and the offset address column 1004 may include one to a number of entries. A given entry in the block identification column 1002 is associated with a given entry in the offset address column 1004. Furthermore, as described above in conjunction with FIG. 9, the offset addresses stored in the offset address column 1004 are logical addresses based on the physical address and the number of times the stored data has wrap around the address space.

A value of the identification of a block of data is unique relative to the other values of identifications of blocks of data. While the identification of the blocks of data may be based on one of a number of different identifications, in one embodiment, the identification of a block of data is a hash/fingerprint of the data stored in the block of data. However, embodiments of the invention are not so limited, as the identification of a block of data can be other types of numbers, such as a random number assigned when the block of data is stored in the backup storage device 208 a sequentially assigned number when the block of data is stored in the backup storage device 208 a timestamp of when the block of data is stored in the backup storage device 208, etc.

As shown in FIG. 10A, a block of data at address 503 within the backup storage device 208 has an identification of 27. The block of data at address 21 within the backup storage device 208 has an identification of 358. The block of data at address 1558 within the backup storage device 208 has an identification of 103. The block of data at address 3002 within the backup storage device 208 has an identification of 18. The block of data at address 161 within the backup storage device 208 has an identification of 132. The block of data at address 7 within the backup storage device 208 has an identification of 4500. The block of data at address 2001 within the backup storage device 208 has an identification of 55501. The block of data at address 1513 within the backup storage device 208 has an identification of 4502. The block of data at address 998 within the backup storage device 208 has an identification of 11.

With regard to FIG. 10B, similar to the location table 112 of FIG. 3, the referencing nodes location table 704 includes a block identification column 1006 and an address column (an offset address column 1008). Additionally, the referencing nodes location table 704 includes a minimum offset column 1010. The minimum offset for a block of data stored in the log of backup data 708 is the smallest valued address of a block of data that is referenced by the block of data. In other words, for a given node, the minimum offset is the smallest valued address from among the descendent nodes of the given node. Returning to FIG. 4 to help illustrate, for the block of data for the interior node 408, the minimum offset is the smallest valued address from among the blocks of data for nodes that the interior node 408 references (i.e., the interior node 414, the leaf node 422, the leaf node 424, the interior node 416, the leaf node 426, the leaf node 428 and the leaf node 430). For example, assume the block of data for the interior node 414 is stored at address 101, the block of data for the leaf node 422 is stored at address 150, the block of data for the leaf node 424 is stored at address 1050, the block of data for the interior node 416 is stored at address 2550, the block of data for the leaf node 426 is stored at address 12, the block of data for the leaf node 428 is stored at address 1670 and the block of data for the leaf node 430 is stored at address 554. Accordingly, the minimum offset for the block of data for the interior node 408 is 12.

In the referencing nodes location table 704 of FIG. 10B, a block of data at address 557 within the backup storage device 208 has an identification of 12 and a minimum offset address of 1101. A block of data at address 97 within the backup storage device 208 has an identification of 458 and a minimum offset address of 5. A block of data at address 1411 within the backup storage device 208 has an identification of 33 and a minimum offset address of 1215. A block of data at address 119 within the backup storage device 208 has an identification of 3332 and a minimum offset address of 17. A block of data at address 251 within the backup storage device 208 has an identification of 1505 and a minimum offset address of 4901. A block of data at address 3009 within the backup storage device 208 has an identification of 44 and a minimum offset address of 1345. A block of data at address 1201 within the backup storage device 208 has an identification of 901 and a minimum offset address of 569. A block of data at address 5009 within the backup storage device 208 has an identification of 1010 and a minimum offset address of 352. A block of data at address 58 within the backup storage device 208 has an identification of 8 and a minimum offset address of 698.

As described above in conjunction with the description of the location table 112 in FIG. 3, the backup logic 124 and the garbage collection logic 706 use the nonreferencing nodes location table 702 and the referencing nodes location table 704 to locate blocks of data that are referenced based on their identifications instead of their actual addresses within the backup storage device 208. Accordingly, if a first block of data includes a reference to a second block of data, the first block of data stores the identification of the second block of data instead of the address. When the second block of data is dereferenced through the first block of data, the location tables 702 and 704 are used to translate the identification to the actual address within the backup storage device 208. Accordingly, when blocks of data are moved or copied within the backup storage device 208, the location tables 702 and 704 only needs to be updated with regard to the change of address for this block of data (rather than each of the different references in the blocks of data). Moreover, as will be further described below, the garbage collection logic 706 performs garbage collection on segments at the tail of the log of backup data 708 based on the minimum offsets 1010.

When a block of data is retrieved and stored (and is representative of or associated with a leaf node of a storage tree) into the log of backup data 708, the allocator logic 122 generates an entry into the nonreferencing nodes location table 702 that includes the block identification and the offset address where the block of data is stored. When a block of data associated with an interior node of a storage tree is created by the tracking logic 120 to allow for the sharing of the blocks of data within and among the storage trees, the tracking logic 120 also generates an entry into the referencing nodes location table 704 that includes the block identification, the offset address and the minimum offset.

Incremental Garbage Collection Operations

Figure 11:
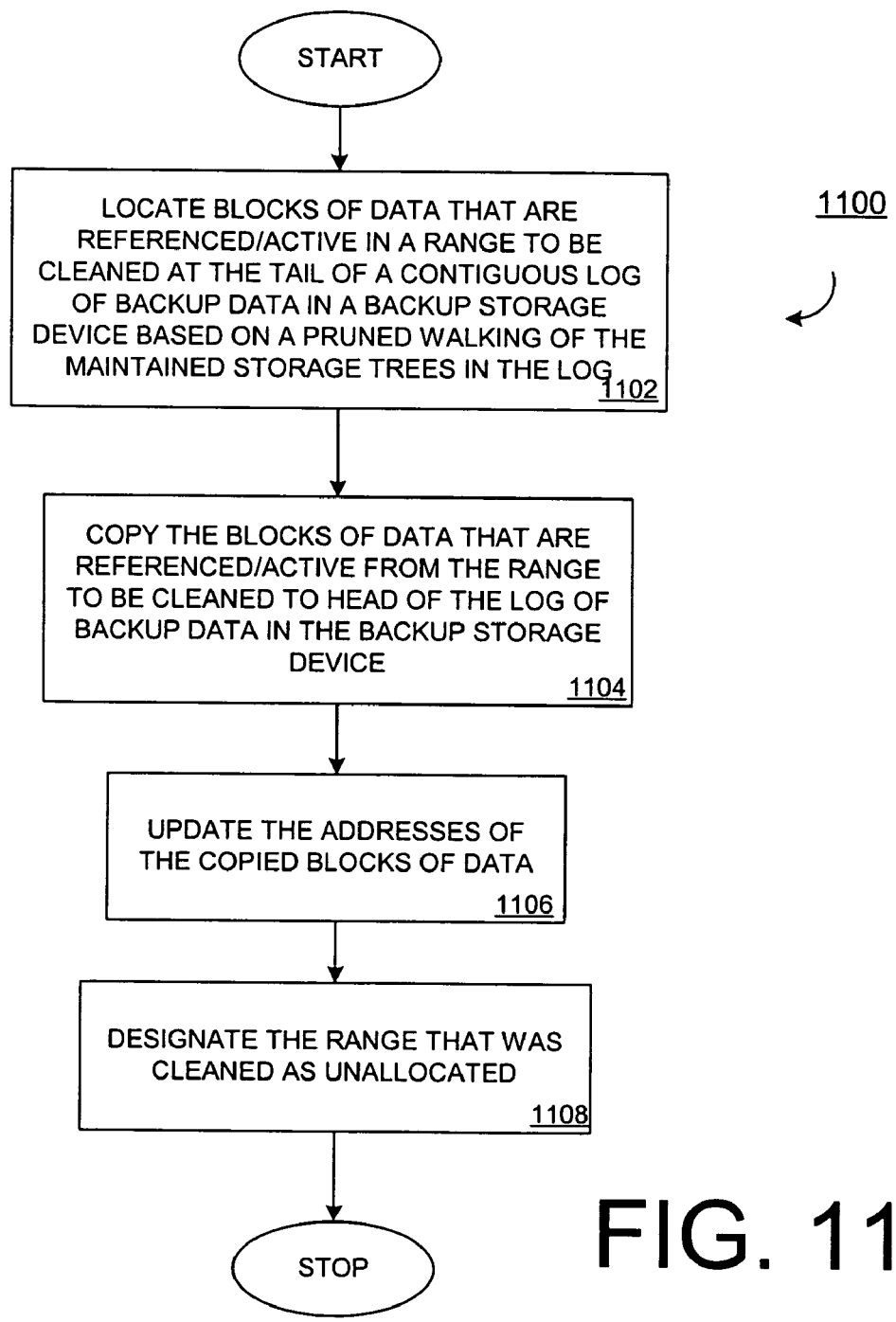
FIG. 11 illustrates a flow diagram for an incremental garbage collection of data stored as a log in a secondary storage, according to one embodiment of the invention.

The operations of the backup system 700 will now be described. FIG. 11 illustrates a flow diagram for an incremental garbage collection of data stored as a log in a secondary storage, according to one embodiment of the invention.

In block 1102 of the flow diagram 1100, the blocks of data that are referenced/active in a segment to be cleaned at the tail of a log of backup data in a backup storage device are located based on a pruned walking of the maintained storage trees (those still active and not marked as deleted or set for deletion) in the log. With reference to the backup system 700, the garbage collection logic 706 locates the blocks of data that are referenced/active in a segment at the tail of the log of backup data 708 in the backup storage device 208. In one embodiment, the garbage collection logic 706 is able to perform a pruned walking of the maintained storage trees based on the minimum offset address of descendent nodes of a given node (illustrated in the referencing nodes location table 704 of FIG. 10B). One embodiment of this locating based on the minimum offset address for a given node is described in more detail below in conjunction with the flow diagram 1200 of FIG. 12. Control continues at block 1104.

In block 1104, the blocks of data that are referenced/active within the segment to be cleaned are copied to the head of the log in the backup storage device 208. With reference to the backup system 700, the garbage collection logic 706 copies the blocks of data that are referenced/active within the segment to the head of the log. Control continues at block 1106.

In block 1106, the addresses of the copied blocks of data are updated. With reference to the backup system 700, the garbage collection logic 706 updates the addresses of the copied blocks of data in the nonreferencing nodes location table 702 and the referencing nodes location table 704. The garbage collection logic 706 updates these references by updating the entries within the nonreferencing nodes location table 702 or referencing nodes location table 704 associated with this block of data. As described above, if the copied block of data is a leaf node of the storage tree, the associated entry for the block of data is stored in the nonreferencing nodes location table 702 and is updated within the new address. If the copied block of data is an interior node of the storage tree, the associated entry for the block of data is in the referencing nodes location table 704 and is updated with the new address. In other words, the garbage collection logic 706 updates the offset address column 1008 for this entry. Moreover, the garbage collection logic 706 updates the minimum offset for the current node in the referencing nodes location table 704 based on the new addresses of the blocks of data that were copied and are descendent nodes of the current node. A more detailed description of the updating of the minimum offset for a node in the referencing nodes location table 704 is described in more detail below in conjunction with FIG. 12. Control continues at block 1108.

In block 1108, the segment that is cleaned is designated as unallocated. With reference to the backup system 700, the garbage collection logic 706 marks the segment that is cleaned as unallocated. Accordingly, the data within this segment may be overwritten by other data stored into the backup system 700. In other words, the blocks of data within this segment that are referenced/active have been copied, while the other blocks of data within the segment (unreferenced/inactive) may be overwritten, as such data is no longer being used. The operations of the flow diagram 1100 are complete with reference to the given segment to be cleaned.

Figure 12:
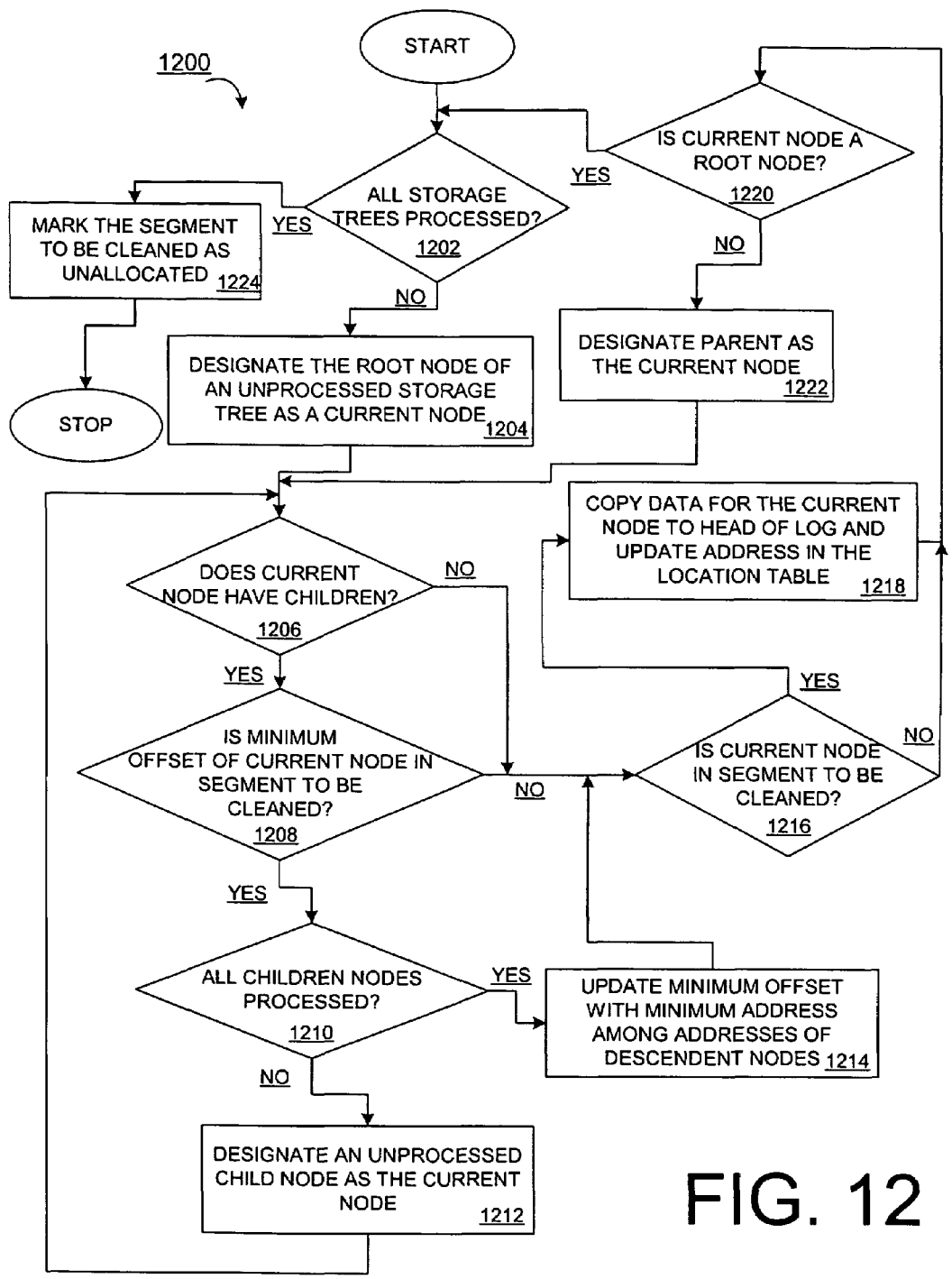
FIG. 12 illustrates a more detailed flow diagram for an incremental garbage collection of data stored as a log in a secondary storage, according to one embodiment of the invention.

A more detailed embodiment of an incremental garbage collection operation will now be described. In particular, FIG. 12 illustrates a more detailed flow diagram for an incremental garbage collection of data stored as a log in a secondary storage, according to one embodiment of the invention.

In block 1202, a determination is made of whether all storage trees of blocks of data have been processed. With reference to the backup system 700, the garbage collection logic 706 determines whether all storage trees of blocks of data (as shown in FIG. 4) have been processed. In one embodiment, the garbage collection logic 706 determines whether all storage trees of blocks of data have been processed based on whether all of the root nodes of the storage trees have been processed. In particular, the operations of the flow diagram 1200 are such that the descendent nodes of a root node have been processed (including copying of the associated blocks of data that are within the segment to be cleaned to the head of the log) if the root node has been processed.

In block 1204, upon determining that all of the storage trees of blocks of data have not been processed, the root node for an unprocessed storage tree is designated as the current node. With reference to the backup system 700 and FIG. 4, the garbage collection logic 706 designates a root node of one of the number of unprocessed storage trees as the current node. Control continues at block 1206.

In block 1206, a determination is made of whether the current node has children nodes. With reference to the backup system 700 and FIG. 4, the garbage collection logic 706 determines whether the current node has children nodes. In one embodiment, the garbage collection logic 706 determines whether the current node has children nodes by determining whether the current node references other nodes. For example, the current node could point to one of a number of other nodes. Upon determining that the current node does not have children nodes, control continues at block 1216, which is described in more detail below.

In block 1208, upon determining that the current node does have children nodes, a determination is made of whether the minimum offset of the current node is within the segment to be cleaned. With reference to the backup system 700, the garbage collection logic 706 determines whether the minimum offset of the current node is within the segment to be cleaned. As described above, the minimum offset of a current node is the minimum valued address among the addresses of the descendent nodes of the current node. The minimum offset of a referencing node (i.e., a node having children nodes) is stored as an entry within referencing nodes location table 704. This value is then compared to the range of addresses of the segment being cleaned. Upon determining that the minimum offset of the current node is not within the segment to be cleaned, control continues at block 1216, which is described in more detail below. As described, the garbage collection operations illustrated by the flow diagram 1200 clean segments at the tail of the log. Accordingly, if the minimum offset is not within the segment to be cleaned at the tail of the log, no descendent nodes of the current node are within the segment to be cleaned. Therefore, these operations allow for a reduced or pruned search of the blocks of data that are referenced/active within a segment to be cleaned within the log.

In block 1210, upon determining that the minimum offset of the current node is within the segment to be cleaned, a determination is made of whether all children nodes of the current node have been processed. With reference to the backup system 700, the garbage collection logic 706 determines whether all children nodes of the current node are processed. In one embodiment, the garbage collection logic 706 makes this determination by tracking the children nodes of the current node and which of such nodes have been processed.

In block 1212, upon determining that all of the children nodes have not been processed, an unprocessed child node of the current node is designated as the current node. With reference to the backup system 700, the garbage collection logic 706 designates one of the unprocessed children nodes of the current node as the current node. Control continues at block 1206, wherein a determination is made of whether the current node has children nodes.

In block 1214, upon determining that all of the children nodes of the current node have been processed (from block 1210), the minimum offset for the current node is updated with the minimum address among the addresses of the descendent nodes. With reference to the backup system 700, the garbage collection logic 706 updates the minimum offset for the current node in the referencing nodes location table 704 based on the new addresses of the blocks of data that were copied (as part of the operations in block 1218 described below) and are descendent nodes of the current node.

Therefore, the current node along with its referenced nodes will not have to be revisited during the continued operations. For example, assume that the descendent nodes of the interior node 416 that are within the segment to be cleaned have been copied based on the processing of the interior node 416 when the storage tree having the root node 402 was processed. Accordingly, the minimum offset for the interior node 416 will not be within the segment to be cleaned. Therefore, when the minimum offset for interior node 416 is checked during the processing of the storage tree having the root node 404, its value will be greater than the values of the address space being cleaned. In other words, the search for referenced/active blocks of data within the segment being cleaned is pruned or reduced, thereby increasing the rate of the garbage collection operations. Moreover, when the storage trees are snapshots of data wherein the amount of variation for the data across the different storage trees is small, the amount of pruning or reduction in the searching of these blocks of data increases. Control continues at block 1216.

In block 1216, a determination is made of whether the current node is within the segment to be cleaned. With reference to the backup system 700, the garbage collection logic 706 determines whether the current node is within the segment to be cleaned based on whether the address of the block of data associated with the current node is within the segment. The garbage collection logic 706 determines the address of the current node by dereferencing the block identification of the block associated with the current node within the referencing nodes location table 704. For example, assume that the segment to be cleaned includes addresses from zero to 100 and that the address of the current node is 505 based on the dereferencing of the block identification of the current node using the referencing nodes location table 704. Therefore, the current node is not within the segment to be cleaned. Upon determining that the current node is not within the segment to be cleaned, control continues at block 1220, which is described in more detail below.

In block 1218, upon determining that the current node is within the segment to be cleaned, the block of data associated with the current node is copied to the head of the log and the address for this copied block of data is updated within non-referencing nodes location table 702 or referencing nodes location table 704. With reference to the backup system 700, the garbage collection logic 706 copies the block of data associated with the current node to the head of the log of the backup data 708. As described above, the log of backup data 708 includes a tail from which the segment to be cleaned is selected and a head wherein the referenced/active blocks of data within the segment are copied. The head of the log includes storage space that is unallocated. Moreover, when a block of data is copied to the head of the log, the garbage collection logic 706 updates the address of the head of the log to the address after the end of the block of data that has been copied to the previous head of the log. Control continues at block 1220.

In block 1220, a determination is made of whether the current node is a root node. With reference to the backup system 700, the garbage collection logic 706 determines whether the current node is a root node. Upon determining that the current node is a root node, control continues at block 1202.

In block 1222, upon determining that the current node is not a root node, the parent node of the current node is designated as the current node. With reference to the backup system 700, the garbage collection logic 706 designates the parent node of the current node as the current node. Control continues at block 1206.

In block 1224, upon determining that all of the storage trees of blocks of data have been processed, the segment to be cleaned is marked as unallocated. With reference to the backup system 700, the garbage collection logic 706 marks the segment to be cleaned as unallocated. Accordingly, the data within this segment may be overwritten by other data stored into the backup system 700. In other words, the blocks of data within this segment that are referenced/active have been copied, while the other blocks of data within the segment (unreferenced/inactive) may be overwritten, as such data is no longer being used. The operations of the flow diagram 1200 are complete with reference to the given segment to be cleaned.

As described, the operations of the flow diagrams 1100 and 1200 allow for a reduced or pruned search of the blocks of data that are referenced/active within the segment to be cleaned within a log. Moreover, once a segment has been cleaned, the other prior segments in the log are considered cleaned. Returning to FIG. 9 to help illustrate, a first segment to be cleaned at the tail of the log may be from address zero to address 100, while the second segment to be cleaned may be from address 101 to address 200, etc. Accordingly, when the segment cleaned is from address 1401 to 1500, the addresses that are considered cleaned (unallocated) are from address zero to address 1500.

Further, the size of the segment to be cleaned is variable. For example, the size of the segment can be the length of one block of data. Therefore, the rate of the garbage collection operations would increase as the number of nodes that is traversed is pruned based on checking the minimum offset address value among descendent nodes. In particular, only a single block of data is within the segment to be cleaned.

Figure 13:
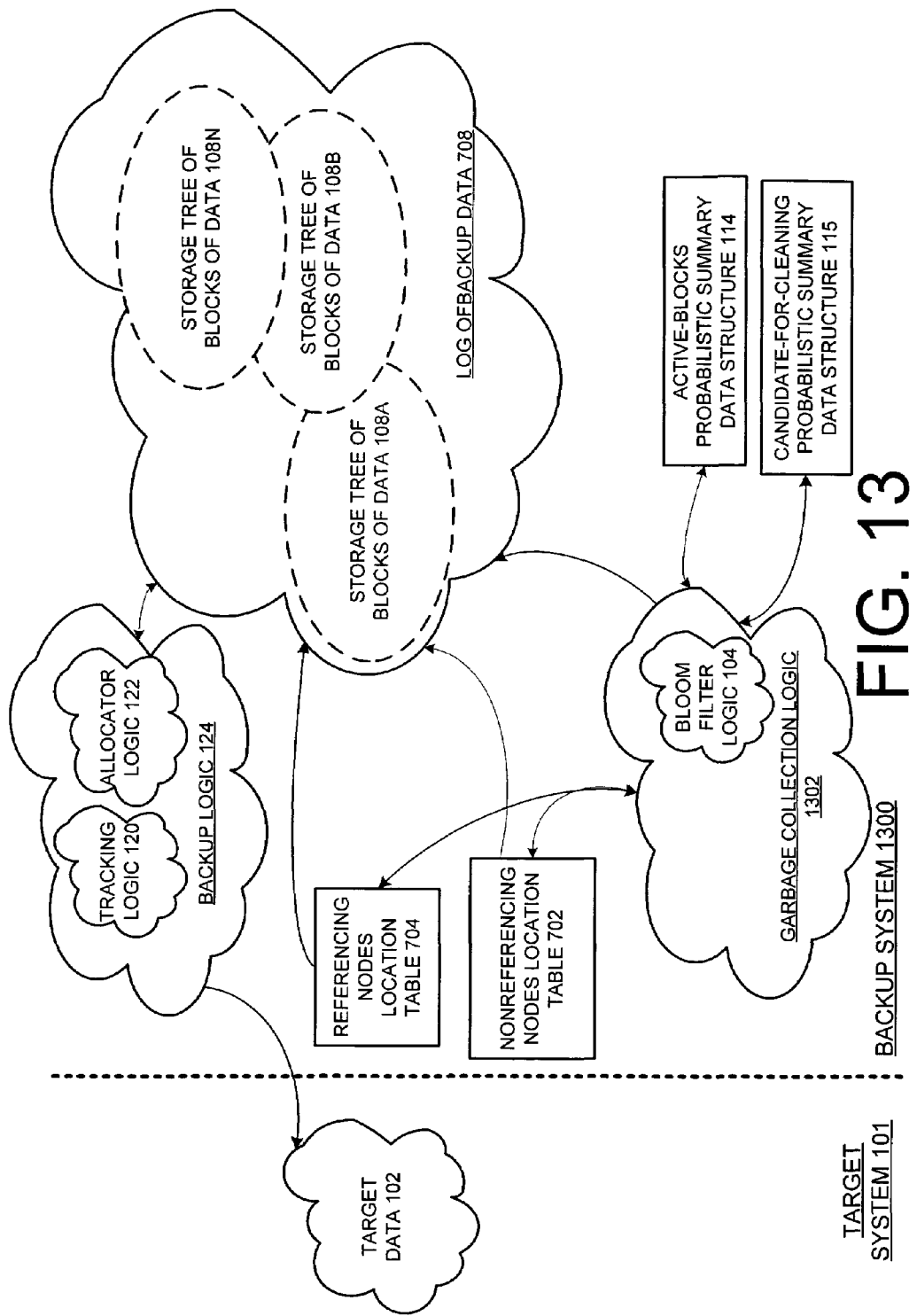
FIG. 13 illustrates a block diagram of a system that includes the Bloom filter-based garbage collection operations and the incremental garbage collection operations, according to one embodiment of the invention.

Bloom Filter-Based Garbage Collection Operations and Incremental Garbage Collection Operations of Data in a Secondary Storage In one embodiment, the Bloom filter-based garbage collection operations can operate in conjunction with the incremental garbage collection operations of a storage device wherein the data is stored as a log within the storage device. In particular, FIG. 13 illustrates a block diagram of a system that includes the Bloom filter-based garbage collection operations and the incremental garbage collection operations, according to one embodiment of the invention. Similar to FIGS. 1 and 7, FIG. 13 includes a backup system 1300 and the target system 101. The target system 101 includes the target data 102 that is backed up/stored within and by the backup system 1300.

The backup system 1300 includes components from both the backup system 100 and the backup system 700. The backup system 1300 includes the backup logic 124, a garbage collection logic 1302, the nonreferencing nodes location table 702, the referencing nodes location table 704, the active-blocks probabilistic summary data structure 114, the candidates-for-cleaning probabilistic summary data structure 115 and the log of backup data 708. Garbage collection logic 1302 includes a Bloom filter logic 104. The backup logic 124 includes a tracking logic 120 and an allocator logic 122. As in the backup systems 100 and 700, the backup system 1300 includes backup data stored therein.

According to one embodiment, for the cleaning of a segment at the tail of the log (as described in the flow diagrams 1100 and 1200), the operations include the copying of the blocks of data that are active/referenced in such segment. In an embodiment, the garbage collection logic 1302 incorporates the Bloom filter logic 104 to generate an active-blocks probabilistic summary data structure 114 for those blocks of data that are referenced/active within the segment to be cleaned. Therefore, the garbage collection logic 1302 can locate the blocks of data to be copied and generate the active-blocks probabilistic summary data structure 114. Subsequently, the garbage collection logic 1302 utilizes the active-blocks probabilistic summary data structure 114 for the copying of these blocks of data to the head of the log.

Thus, a method and apparatus for different embodiments of garbage collection of data in a secondary storage have been described. Although the present invention has been described with reference to specific exemplary embodiments, it will be evident that various modifications and changes may be made to these embodiments without departing from the broader spirit and scope of the invention. For example, while the application of a Bloom filter to the secondary storage of data is described in reference to garbage collection operations of such data, in another embodiment, the application of the Bloom filter can be applied to free block management operations for determining if an address within the secondary storage currently includes data stored therein. In particular, the addresses within the secondary storage having data stored therein could be inputted into a Bloom filter to generate an encoded value representative of those addresses having data. Accordingly, an application could input an address into the Bloom filter to determine if the address has data stored therein.

Moreover, the blocks of data within the backup system 100 may be comprises of different classes, wherein different classes may be processed differently with regard to garbage collection. For example, the garbage collection operations described herein may be applied to active blocks within a range of the address space to be cleaned and which are classified as leaf nodes within a storage tree. Therefore, the specification and drawings are to be regarded in an illustrative rather than a restrictive sense.

What is claimed is:

1. A method of garbage collecting in a storage device comprising:

locating blocks of data stored in a contiguous circular log that are both referenced by at least one other block of data stored within a set of one or more storage trees and within a range at a tail of the log using pruned walking, the range representing an address range within an allocated segment of the log, each storage tree representing active snapshots of user-generated data stored from each one of a plurality of remote computer systems taken at different points in time and having a plurality of nodes, each node representing a block of data of an active snapshot associated with each storage tree, the plurality of nodes including leaf nodes representing data blocks of the user-generated data stored from each one of the plurality of remote computer systems and root and intermediate nodes representing data blocks of system-generated data created by the storage device, the system-generated data including pointers to reference other data blocks of the user-generated data to enable overlapping and sharing of the user-generated data between and among different snapshots of the plurality of snapshots, each block of data stored within the circular log in a sequential order, wrapping around to a beginning of the log once an end of the log is reached and the beginning of the log has been cleaned, so that the size of the contiguous log does not increase beyond its originally allocated size;

copying the blocks of data that are referenced by one or more other blocks of data of other nodes and within the range to an unallocated segment of the log, wherein blocks of data that are not referenced by other blocks of data and within the range remain untouched, and marking the range at the tail of the log as unallocated so that at least a portion of an address space within the range is reclaimed.

2. The method of claim 1, wherein locating the blocks of data that are referenced and within the range includes determining a minimum value among addresses of descendent nodes of a node, wherein the minimum value represents a minimum address offset of a note that is closest referenced from the blocks of data.

3. The method of claim 2, wherein a location table includes an entry for nodes that reference other nodes and wherein determining the minimum value among addresses of descendent nodes of the node includes retrieving the minimum value from an entry in the location table associated with the node.

4. The method of claim 3, wherein locating the blocks of data that are referenced and within the range includes processing the descendent nodes of the node upon determining that the minimum value among the addresses of the descendent nodes is within the range.

5. The method of claim 4, comprising modifying the addresses of the copied blocks of data that are stored in the location table based on the new locations of the copied blocks of data in the log.

6. The method of claim 4, further comprising modifying the minimum value in the entry in the table associated with the node when the minimum value changes based on the new locations of the copied blocks of data that are associated with descendent nodes of the node.

7. A method comprising:
garbage collecting in a circular log within a range of addresses in a storage system having a plurality of storage trees representing active snapshots of user-generated data stored from each one of a plurality of remote computer systems taken at different points in time, each storage tree having a plurality of nodes, each node representing a block of data of an active snapshot associated with each storage tree, the plurality of nodes including leaf nodes representing data blocks of the user-generated data stored from each one of the plurality of remote computer systems and root and intermediate nodes representing data blocks of system-generated data created by the storage device, the system-generated data including pointers to reference other data blocks of the user-generated data to enable overlapping and sharing of the user-generated data between and among different snapshots of the plurality of snapshots, and each storage tree having multiple references to a same block of data, wherein each block of data is stored within the circular log as contiguous data in a sequential order, wrapping around to a beginning of the log once an end of the log is reached and the beginning of the log has been cleaned, so that the size of the log does not increase beyond its originally allocated size, the garbage collecting including:
pruning walking of the plurality of storage trees to determine active blocks of data within said range, where active blocks of data are those that are referenced by at least one other block of data still stored within one of the plurality of storage trees, the pruning walking including:
determining, based on accessing in one of said plurality of storage trees a parent node that has a plurality of descendent nodes, that none of the plurality of descendant nodes are associated with blocks of data within the range; and
skipping the walking of the plurality of descendent nodes based on said determining,
wherein the active blocks determined to be in the range are copied out of the range and the range is marked as unallocated so that at least a portion of the address space within the range is reclaimed.

8. The method of claim 7, wherein the blocks of data are stored in a log and the range is a segment of the log.

9. The method of claim 8, wherein the segment is at the tail of the log.

10. The method of claim 9, wherein the determining is performed by comparing a minimum offset of the plurality of descendent nodes against the range, wherein the minimum offset is accessed when walking the parent node and without walking the plurality of descendent nodes.

11. The method of claim 7, wherein the range is a segment at the tail of a log and said copying is from the said segment at the tail to a segment at the head of the log.

12. The method of claim 7, wherein said copying includes updating addresses of the copied blocks of data within a location table.

13. A method of garbage collecting in a storage system comprising:
performing the following operations in a circular log until each block of data that is active in a range to be cleaned at a tail of the log of data is copied to a head of the log, each block of data stored within the circular log as contiguous data in a sequential order, wrapping around to a beginning of the log once an end of the log is reached and the beginning of the log has been cleaned, so that the size of the log does not increase beyond its originally allocated size, wherein the range to be cleaned is a range of addresses in the storage system, the storage system having a plurality of storage trees representing active snapshots of user-generated data stored from each one of a plurality of remote computer systems taken at different points in time, each storage tree having a plurality of nodes, wherein each block of data is represented by a node of the storage tree, the plurality of nodes including leaf nodes representing data blocks of the user-generated data stored from each one of the plurality of remote computer systems and root and intermediate nodes representing data blocks of system-generated data created by the storage device, the system-generated data including pointers to reference other data blocks of the user-generated data to enable overlapping and sharing of the user-generated data between and among different snapshots of the plurality of snapshots, the operations including:
locating blocks of data in the log that are both referenced by at least one other block of data stored within the nodes of the plurality of storage trees and within the range to be cleaned using pruned walking;
copying blocks of data associated with child nodes of a current node that are within the range to be cleaned to the head of the log;
retrieving a block of data associated with the current node, upon determining that a minimum address value among addresses of descendent nodes is within the range to be cleaned;
designating, as the current node, one of the child nodes of the current node that is an interior node, upon determining that at least one child node is an interior node;
designating, as the current node, an ancestor node of the current node whose descendent nodes are unprocessed; and
marking the range as unallocated when the blocks of data that are active and within the range are copied to the head of the log so that at least a portion of the address space within the range to be cleaned is reclaimed.

14. The method of claim 13, wherein performing the following until each block of data that is active in the range to be cleaned at the tail of the log of data is copied to a head of the log includes updating addresses of that copied blocks of data within a location table.

15. The method of claim 13, wherein performing the following until each block of data that is active in the range to be cleaned at the tail of the log of data is copied to the head of the log includes updating a minimum address value among addresses of descendent nodes for an entry for the current node in a location table when the minimum address value changes based on copying of the blocks of data associated with the descendent nodes of the current node.

16. The method of claim 13, wherein at least one block of data stored in the log is referenced by more than one of other blocks of data.

17. A system comprising:
a storage device to store a number of blocks of data in a circular log of contiguous data, wherein the blocks of data that are marked as allocated are non-modifiable, wherein each block of data within the circular log is stored in a sequential order, wrapping around to a beginning of the log once an end of the log is reached and the beginning of the log has been cleaned, so that the size of the log does not increase beyond its originally allocated size; and
a garbage collection logic to locate the blocks of data that are both referenced by at least one other block stored within a set of one or more storage trees, and within a range at a tail of the log using pruned walking, the range representing an address range to be cleaned within an allocated segment of the log,
wherein the log is implemented in a hierarchical architecture having a plurality of storage trees, each representing a snapshot taken at a point in time of target data being processed, each storage tree having a plurality of nodes, and each node representing a block of data of an active snapshot associated with each storage tree, each of the active snapshots including user-generated data stored from a file system located on a remote computer taken at a different time, each storage tree having a plurality of nodes including leaf nodes representing data blocks of the user-generated data stored from the remote computer file system and root and intermediate nodes representing data blocks of system-generated data created by the storage device, the system generated data including pointers to reference other data blocks of the user-generated data to enable overlapping and sharing of the user-generated data between and among different snapshots of the plurality of snapshots,
and wherein said garbage collection logic is operable to copy the located blocks of data to a head of the log and mark the range to be cleaned as unallocated so that at least a portion of the address space within the range is reclaimed.

18. The system of claim 17, wherein the garbage collection logic is to copy the blocks of data that are referenced to an unallocated address space of the log.

19. The system of claim 18, wherein the garbage collection logic is to copy the blocks of data that are referenced to a head of the log.

20. The system of claim 17, wherein at least one of the number of blocks of data are referenced by more than one reference.

21. The system of claim 17 comprising a location table to include entries associated with interior nodes of a storage tree, wherein each entry is to include a minimum value among the addresses of descendent nodes of the associated interior node.

22. The system of claim 21, wherein the garbage collection logic is to locate the blocks of data that are referenced and within the range at the tail of the log based on the minimum values stored in the entries of the location table.

23. A backup system comprising:
a plurality of storage trees stored in a contiguous circular log, each storage tree representing an active snapshot of user-generated data stored from a file system located on a remote computer taken at a different time, each storage tree having a plurality of nodes, including leaf nodes representing data blocks of the user-generated data stored from the remote computer file system and root and intermediate nodes representing data blocks of system-generated data created by the storage device, the system generated data including pointers to reference other data blocks of the user-generated data to enable overlapping and sharing of the user-generated data between and among different snapshots of the plurality of snapshots, wherein each leaf node of user-generated data from said remote computer file system has been backed up from a set of one or more storage devices within the remote computer, each block of data is stored within the circular log in a sequential order, wrapping around to a beginning of the log once an end of the log is reached and the beginning of the log has been cleaned, so that the size of the contiguous log does not increase beyond its originally allocated size;
a storage space to store said blocks of data having been allocated from a backup storage space in said set of one or more storage devices;
a set of one or more location tables having stored therein a minimum address value for descendent nodes of interior nodes of said plurality of storage trees; and
a garbage collection logic to clean a currently selected range from the tail of said log, said garbage collection logic to perform pruned walking of nodes of said plurality of storage trees based on said set of location tables and said currently selected range to locate blocks of data that are referenced by at least one other block of data currently stored within the plurality of storage trees.

24. The backup system of claim 23, wherein two different nodes of a same storage tree reference a same node in the same storage tree.

25. The backup system of claim 23, wherein the garbage collection logic is to update references to a node that is within the currently selected range based on an update to an entry in the set of one or more location tables.

26. The backup system of claim 23, wherein the garbage collection logic is to prune walking of the nodes of said plurality of storage trees based on the minimum addresses stored in the set of one or more location tables.

27. An apparatus comprising:
a hardware backup system to backup a file system located on a remote computer by storing the file system to a circular log as contiguous blocks of data, said backup file system including:
a tracking logic to generate a plurality of storage trees, each storage tree representing active backup snapshots of user-generated data stored from said remote computer file system taken at different times by recording references to blocks of backed up data stored in a set of one or more storage devices, each storage tree having a plurality of nodes including leaf nodes representing data blocks of the user-generated data stored from the remote computer file system and root and intermediate nodes representing data blocks of system-generated data created by the storage device, the system-generated data including pointers to reference other data blocks of the user-generated data to enable overlapping and sharing of the user-generated data between and among different snapshots of the plurality of snapshots, each block of data stored within the circular log in a sequential order, wrapping around to a beginning of the log once an end of the log is reached and the beginning of the log has been cleaned, so that the size of the contiguous log does not increase beyond its originally allocated size;

an allocator logic to allocate contiguous blocks of storage space from a log of a back up storage space to store said blocks of backed up data;

a garbage collection logic to, responsive to deletion of one or more of said active backup snapshots, clean a currently selected contiguous range from the tail of said log, said garbage collection logic to, walk only those nodes of said plurality of storage trees that possibly identify those of said blocks of data that are stored in said currently selected contiguous range or that possibly are themselves stored in said currently selected contiguous range, locate blocks of data that are referenced by at least one other block of data stored within the plurality of storage trees, and sweep said currently selected contiguous range, copying blocks of data that are referenced and within the range out of the range and marking the range as unallocated so that at least a portion of the address space within the range is reclaimed.

28. The apparatus of claim 27, wherein the plurality of storage trees include interior nodes and leaf nodes, the interior nodes to include references to other nodes in one or more of the plurality of storage trees, wherein two different interior nodes of a same tree references a same node in the same tree.

29. A computer-storage medium that stores instructions, which when executed by a computer, cause said computer to perform garbage collection operations in a hardware storage device comprising:

locating blocks of data stored in a circular log that are both referenced by at least one other block of data stored within a plurality of storage trees and within a range at a tail of the log using pruned walking, the range representing an address range to be cleaned within an allocated segment of the log, each storage tree representing active snapshots of user-generated data stored from each one of a plurality of remote computer systems at different points in time and having a plurality of nodes, and each node representing a block of data of an active snapshot associated with each storage tree, the plurality of nodes including leaf nodes representing data blocks of the user-generated data stored from each one of the plurality of remote computer systems and root and intermediate nodes representing data blocks of system-generated data created by the storage device, the system-generated data including pointers to reference other data blocks of the user-generated data to enable overlapping and sharing of the user-generated data between and among different snapshots of the plurality of snapshots, wherein each block of data within the circular log is stored as contiguous data in a sequential order, wrapping around to a beginning of the log once an end of the log is reached and the beginning of the log has been cleaned, so that the size of the log does not increase beyond its originally created size;

copying the blocks of data that are referenced and within the range to an unallocated segment of the log, wherein blocks of data that are not referenced by other blocks of data and within the range remain untouched, and marking the range at the tail of the log as unallocated so that at least a portion of an address space within the range is reclaimed.

30. The computer-storage medium of claim 29, wherein locating the blocks of data that are referenced and within the range includes determining a minimum value among addresses of descendent nodes of a node.

31. The computer-storage medium of claim 30, wherein a location table includes an entry for nodes that reference other nodes and wherein determining the minimum value among addresses of descendent nodes of the node includes retrieving the minimum value from an entry in the location table associated with the node.

32. The computer-storage medium of claim 31, wherein locating the blocks of data that are referenced and within the range includes processing the descendent nodes of the node upon determining that the minimum value among the addresses of the descendent nodes is within the range.

33. The computer-storage medium of claim 32 comprising modifying the addresses of the copied blocks of data that are stored in the location table based on the new locations of the copied blocks of data in the log.

34. The computer-storage medium of claim 32 comprising modifying the minimum value in the entry in the table associated with the node when the minimum value changes based the new locations of the copied blocks of data that are associated with descendent nodes of the node.

35. A computer-storage-medium that stores instructions, which when executed by a computer, cause said computer to perform operations in a hardware storage device comprising:

garbage collecting within a range of addresses in circular log of contiguous blocks of data having a plurality of storage trees stored therein, each storage tree representing active snapshots of user-generated data stored from each one of a plurality of remote computer systems taken at different times and having a plurality of nodes, the plurality of nodes including leaf nodes representing data blocks of the user-generated data stored from each one of the plurality of remote computer systems and root and intermediate nodes representing data blocks of system-generated data created by the storage device, the system-generated data including pointers to reference other data blocks of the user-generated data to enable overlapping and sharing of the user-generated data between and among different snapshots of the plurality of snapshots and having multiple references to the same block of data, each block of data stored within the circular log in a sequential order, wrapping around to a beginning of the log once an end of the log is reached and the beginning of the log has been cleaned, so that the size of the contiguous log does not increase beyond its originally allocated size, the garbage collecting including:

pruning walking of the plurality of storage trees to determine active blocks of data within said range, where active blocks of data are those that are referenced by at least one other block of data still in one of the plurality of storage trees, the pruning walking including:

determining, based on accessing in one of said plurality of storage trees a parent node that has a plurality of descendent nodes, that none of the plurality of descendant nodes are associated with blocks of data within the range; and skipping the walking of the plurality of descendent nodes based on said determining, wherein the active blocks determined to be in the range are copied out of the range and the range is marked as unallocated so that at least a portion of the address space within the range is reclaimed.

36. The computer-storage medium of claim 35, wherein the blocks of data are stored in a log and the range is a segment of the log.

37. The computer-storage medium of claim 36, wherein the segment is at the tail of the log.

38. The computer-storage medium of claim 37, wherein the determining is performed by comparing a minimum offset of the plurality of descendent nodes against the range, wherein the minimum offset is accessed when walking the parent node and without walking the plurality of descendent nodes.

39. The computer-storage medium of claim 38, wherein the range is a segment at the tail of a log and said copying is from the said segment at the tail to a segment at the head of the log.

40. The computer-storage medium of claim 38, wherein said copying includes updating addresses of the copied blocks of data within a location table.

41. A computer-storage medium that stores instructions, which when executed by a computer, cause said computer to perform garbage collection operations in a hardware storage device comprising:

performing the following operations in a circular log of contiguous data blocks until each block of data that is active in a range to be cleaned at a tail of the log of contiguous data is copied to a head of the log, wherein the range to be cleaned is a range of addresses in a storage system having a plurality of storage trees, each storage tree having a plurality of nodes, wherein a block of data is associated with a node of the storage tree, each node representing a block of data of an active snapshot associated with each storage tree, each of the active snapshots including user-generated data stored from a file system located on a remote computer taken at a different time, each storage tree having a plurality of nodes including leaf nodes representing data blocks of the user-generated data stored from the remote computer file system and root and intermediate nodes representing data blocks of system-generated data created by the storage device, the system generated data including pointers to reference other data blocks of the user-generated data to enable overlapping and sharing of the user-generated data between and among different snapshots of the plurality of snapshots, and wherein data stored within the log is stored in a sequential order, wrapping around to a beginning of the log once an end of the log is reached and the beginning of the log is cleaned, so that the size of the log does not increase beyond its originally allocated size, the operations including:

locating blocks of data in a log that are both referenced by at least one other block of data stored within the plurality of storage trees, and within the range using pruned walking;

copying blocks of data associated with child nodes of a current node that are within the range to be cleaned to the head of the log;

retrieving a block of data associated with the current node, upon determining that a minimum address value among addresses of descendent nodes is within the range to be cleaned;

designating, as the current node, one of the child nodes of the current node that is an interior node, upon determining that at least one child node is an interior node;

designating, as the current node, an ancestor node of the current node whose descendent nodes are unprocessed; and marking the range at the tail of the log as unallocated when the blocks of data that are active and within the range are copied to the head of the log so that at least a portion of an address space within the range is reclaimed.

42. The computer-storage medium of claim 41, wherein performing the following until each block of data that is active in the range to be cleaned at the tail of the log of data is copied to a head of the contiguous log includes updating addresses of that copied blocks of data within a location table.

43. The computer-storage medium of claim 41, wherein performing the following until each block of data that is active in the segment to be cleaned at the tail of a log of data is copied to the head of the log includes updating a minimum address value among addresses of descendent nodes for an entry for the current node in a location table when the minimum address value changes based on copying of the blocks of data associated with the descendent nodes of the current node.

44. The computer-storage medium of claim 41, wherein at least one block of data stored in the log is referenced by more than one of other blocks of data.

* * * * *